(12) United States Patent
Yoshida et al.

(10) Patent No.: US 10,490,789 B2
(45) Date of Patent: Nov. 26, 2019

(54) ELECTRIC STORAGE DEVICE, ELECTRIC STORAGE DEVICE ASSEMBLY, ELECTRIC AND ELECTRONIC APPARATUS, ELECTRIC MOVING MEANS AND ELECTRIC POWER SYSTEM, AND METHOD OF ASSEMBLING ELECTRIC STORAGE DEVICE ASSEMBLY

(71) Applicant: MURATA MANUFACTURING CO., LTD., Kyoto (JP)

(72) Inventors: Naotake Yoshida, Kyoto (JP); Tatsuya Adachi, Kyoto (JP); Hiroaki Ono, Kyoto (JP); Yasuhiro Watanabe, Kyoto (JP)

(73) Assignee: Murata Manufacturing Co., Ltd., Tokyo (JP)

( * ) Notice: Subject to any disclaimer, the term of this patent is extended or adjusted under 35 U.S.C. 154(b) by 98 days.

(21) Appl. No.: 15/968,200

(22) Filed: May 1, 2018

(65) Prior Publication Data

US 2018/0248161 A1    Aug. 30, 2018

Related U.S. Application Data

(63) Continuation of application No. PCT/JP2016/075891, filed on Sep. 2, 2016.

(30) Foreign Application Priority Data

Nov. 4, 2015    (JP) .................................. 2015-216523

(51) Int. Cl.
| | | |
|---|---|---|
| H01M 2/10 | (2006.01) |
| H01M 2/30 | (2006.01) |
| H01M 2/34 | (2006.01) |
| H01M 10/44 | (2006.01) |

(Continued)

(52) U.S. Cl.
CPC ........... H01M 2/1077 (2013.01); H01M 2/34 (2013.01); H01M 10/425 (2013.01);
(Continued)

(58) Field of Classification Search
CPC ..... H01M 2/1077; H01M 2/34; H01M 10/425
See application file for complete search history.

(56) References Cited

U.S. PATENT DOCUMENTS

| | | |
|---|---|---|
| 2010/0047682 A1 | 2/2010 | Houchin-Miller et al. |
| 2012/0150375 A1 | 6/2012 | Adachi et al. |
| | (Continued) | |

FOREIGN PATENT DOCUMENTS

| | | |
|---|---|---|
| JP | 2012-124043 | 6/2012 |
| JP | 2012-124043 A | 6/2012 |
| | (Continued) | |

OTHER PUBLICATIONS

Extended European Search Report dated Apr. 4, 2019 in corresponding European Application No. 16861834.6.
(Continued)

*Primary Examiner* — Todd M Melton
(74) *Attorney, Agent, or Firm* — K&L Gates LLP

(57) ABSTRACT

An electric storage device is provided. The electric storage device includes a case, first and second terminals, a conduction state switch, an electronic component and a cover member including a connecting portion. The case has a first opening and a second opening on a first surface of the case and is configured to house a battery unit including a first terminal portion and a second terminal portion. The conduction state switch is provided between the first terminal portion of the battery unit and the first terminal of the case. The conduction state switch is in a conducting state when the connecting portion of the cover member is connected with the conduction state switch and the cover member is attached to the first surface of the case and covers the first opening, the second opening, the first terminal and the second terminal.

19 Claims, 13 Drawing Sheets

(51) Int. Cl.
*H01M 10/42* (2006.01)
*H02J 3/38* (2006.01)
*B60K 6/46* (2007.10)
*H02J 7/00* (2006.01)

(52) U.S. Cl.
CPC ........... *H01M 10/441* (2013.01); *H02J 3/382* (2013.01); *B60K 6/46* (2013.01); *B60Y 2200/92* (2013.01); *H01M 2/30* (2013.01); *H01M 2010/4271* (2013.01); *H01M 2220/20* (2013.01); *H02J 7/007* (2013.01); *Y10S 903/903* (2013.01)

(56) References Cited

U.S. PATENT DOCUMENTS

| | | |
|---|---|---|
| 2013/0288086 A1 | 10/2013 | Kim et al. |
| 2013/0288530 A1 | 10/2013 | Zhao |
| 2016/0149177 A1 | 5/2016 | Sugeno et al. |

FOREIGN PATENT DOCUMENTS

| | | |
|---|---|---|
| JP | 2013-251127 | 12/2013 |
| JP | 2013-251127 A | 12/2013 |
| JP | 2014-232566 | 12/2014 |
| JP | 2014-232566 A | 12/2014 |
| JP | 2015-011956 | 1/2015 |
| JP | 2015-011956 A | 1/2015 |
| JP | 2015-507819 | 3/2015 |
| JP | 2015-507819 A | 3/2015 |
| JP | 2015-159105 | 9/2015 |
| JP | 2015-159105 A | 9/2015 |
| WO | 2013/047399 A1 | 4/2013 |
| WO | 2015/111758 A2 | 7/2015 |

OTHER PUBLICATIONS

International Search Report and Written Opinion issued in connection with International Patent Application No. PCT/JP2016/075891 dated Nov. 22, 2016. (9 pages).

ELECTRIC STORAGE DEVICE, ELECTRIC STORAGE DEVICE ASSEMBLY, ELECTRIC AND ELECTRONIC APPARATUS, ELECTRIC MOVING MEANS AND ELECTRIC POWER SYSTEM, AND METHOD OF ASSEMBLING ELECTRIC STORAGE DEVICE ASSEMBLY

CROSS REFERENCE TO RELATED APPLICATIONS

The present application is a continuation of PCT patent application no. PCT/JP2016/075891, filed on Sep. 2, 2016, which claims priority to Japanese patent application no. JP2015-216523 filed on Nov. 4, 2015, the entire contents of which are being incorporated herein by reference.

BACKGROUND

The present disclosure generally relates to an electric storage device, an electric storage device assembly, an electric and electronic apparatus, an electric moving means and an electric power system, and a method of assembling an electric storage device assembly.

An electric storage device in which a battery unit is housed in a case is well known. The electric storage device has external terminals of both positive and negative electrodes of a battery unit for electrically connecting to both electrodes from the outside of a case, and an electronic component, and has a structure in which the electronic component can be accessed only when at least one side of the external terminals of both electrodes is disconnected from the battery unit.

SUMMARY

The present disclosure generally relates to an electric storage device, an electric storage device assembly, an electric and electronic apparatus, an electric moving means and an electric power system, and a method of assembling an electric storage device assembly.

According to an embodiment, the present disclosure provides an electric storage device and an electric storage device assembly having further higher safety, and an electric and electronic apparatus, an electric moving means and an electric power system which have the electric storage device, and a method of assembling the electric storage device assembly.

According to an embodiment of the present disclosure, an electric storage device is provided. The electric storage device includes:

a case including a first opening and a second opening provided on a first surface of the case, wherein the case is configured to house a battery unit, and the battery unit includes a first terminal portion and a second terminal portion;

a first terminal provided on the first surface of the case;

a second terminal provided on the first surface of the case and connected to the second terminal portion of the battery unit;

a conduction state switch provided between the first terminal portion of the battery unit and the first terminal of the case, wherein the conduction state switch is configured to connect with the first terminal portion of the battery unit and the first terminal;

an electronic component provided opposite to the second opening and configured to be accessed from outside; and a cover member including a connecting portion that is provided on an inner surface opposite to the first surface of the case, wherein the conduction state switch is in a conducting state when the connecting portion of the cover member is connected with the conduction state switch and the cover member is attached to the first surface of the case and covers the first opening, the second opening, the first terminal and the second terminal, wherein each the cover member includes a first and second engaging portions provided at edge portions of the cover member, and wherein the first engaging portion in the cover member of a first electric storage device is engaged with the second engaging portion in the cover member of a second electric storage device adjacent to the first electric storage device.

According to another embodiment of the present disclosure, an electric storage device assembly is provided. The electric storage device assembly includes:

a plurality of electric storage devices; and a rack on which the plurality of electric storage devices are mounted, each of the plurality of electric storage devices including:

a case including a first opening and a second opening provided on a first surface of the case, wherein the case is configured to house a battery unit, and the battery unit includes a first terminal portion and a second terminal portion;

a first terminal provided on the first surface of the case;

a second terminal provided on the first surface of the case and connected to the second terminal portion of the battery unit;

a conduction state switch provided between the first terminal portion of the battery unit and the first terminal of the case, wherein the conduction state switch is configured to connect with the first terminal portion of the battery unit and the first terminal;

an electronic component provided opposite to the second opening and configured to be accessed from outside; and a cover member including a connecting portion that is provided on an inner surface opposite to the first surface of the case, wherein the conduction state switch is in a conducting state when the connecting portion of the cover member is connected with the conduction state switch and the cover member is attached to the first surface of the case and covers the first opening, the second opening, the first terminal and the second terminal, wherein each the cover member includes a first and second engaging portions provided at edge portions of the cover member, and wherein the first engaging portion in the cover member of a first electric storage device is engaged with the second engaging portion in the cover member of a second electric storage device adjacent to the first electric storage device.

As a non-limiting example according to an embodiment, when a first electric storage device is referred to as "electric storage device-A" for convenience, a second electric storage device adjacent to one side of the electric storage device-A (for example, higher voltage side than the electric storage device-A) is referred to as "electric storage device-B" for convenience, and a third electric storage device adjacent to the other side of the electric storage device-A (lower voltage side than the electric storage device-A) is referred to as "electric storage device-C" for convenience, the electric storage device-B, the electric storage device-A and the electric storage device-C are arranged in this order. Then, for example according to an embodiment, a first engaging portion of the electric storage device-A is engaged with a second engaging portion of the electric storage device-B, and a second engaging portion of the electric storage device-A is engaged with a first engaging portion of the electric storage device-C. In a state where the first engaging portion and the second engaging portion are engaged with each other, the first engaging portion and the second engaging portion may be in contact with each other at least in part or may be in a non-contacting state, and in general, an orthogonally projected image of the second engaging portion is included in an orthogonally projected image of the first engaging portion. This also applies to the following description. Further, a first terminal for external connection of the electric storage device-A is electrically connected to a second terminal for external connection of the electric storage device-B and a second terminal for external connection of the electric storage device-A is electrically connected to a first terminal for electric storage device-C.

According to another embodiment of the present disclosure, a method of assembling an electric storage device assembly is provided. The method of assembling an electric storage device assembly including:
a plurality of electric storage devices; and
a rack on which the plurality of electric storage devices are mounted,
each of the plurality of electric storage devices including:
a case including a first opening and a second opening provided on a first surface of the case, wherein the case is configured to house a battery unit, and the battery unit includes a first terminal portion and a second terminal portion;
a first terminal provided on the first surface of the case;
a second terminal provided on the first surface of the case and connected to the second terminal portion of the battery unit;
a conduction state switch provided between the first terminal portion of the battery unit and the first terminal of the case, wherein the conduction state switch is configured to connect with the first terminal portion of the battery unit and the first terminal;
an electronic component provided opposite to the second opening and configured to be accessed from outside; and
a cover member including a connecting portion that is provided on an inner surface opposite to the first surface of the case, wherein the connection portion is configured to connect with the conduction state switch,
wherein the electric storage device assembly includes a first and second engaging portions provided at edge portions of the cover member,
the method including:
a step of mounting a first electric storage device on a low-voltage side on the rack next to a second electric storage device on a high-voltage side mounted on the rack with the cover member removed;
a step of electrically connecting the second terminal for external connection of the second electric storage device on the high-voltage side to the first terminal for external connection of the first electric storage device on the low-voltage side; and
a step of attaching the cover member to the case so that the first engaging portion in the cover member of the first electric storage device on the low-voltage side is engaged with the second engaging portion in the cover member of the second electric storage device on the high-voltage side, and an inner surface of the cover member in the first electric storage device on the low-voltage side and the first surface of the case are opposite to each other and the connecting portion is connected to the conduction state switch, to cover the first opening, the second opening, the first terminal for external connection and the second terminal for external connection with the cover member.

According to an embodiment of the present disclosure, An electric and electronic apparatus is provided. The electric and electronic apparatus includes the electric storage device according to the present disclosure described herein, and the electric and electronic apparatus is configured to receive supply of electric power from the electric storage device. Alternatively, the electric and electronic apparatus according to another embodiment of the present disclosure includes the electric storage device assembly according to the present disclosure described herein, and is configured to supply of electric power from the electric storage device assembly.

According to an embodiment of the present disclosure, an electric moving means such as an electric vehicle is provided. The electric vehicle includes:
the electric storage device according to the present disclosure described herein;
a converting device configured to supply of electric power from the electric storage device and convert the electric power into a driving force of a vehicle; and
a control circuit configured to perform information processing for vehicle control based on information on the electric storage device. Alternatively, the electric vehicle according to an embodiment of the present disclosure includes:
the electric storage device assembly according to the present disclosure described herein;
a converting device configured to receive supply of electric power from the electric storage device assembly and convert the electric power into a driving force of a vehicle; and
a control circuit configured to perform information processing for vehicle control based on information on the electric storage device assembly.

According to an embodiment of the present disclosure, an electric power system of the present disclosure is provided and includes the electric storage device according to the present disclosure described herein and a receiving device configured to receive information via a network with another apparatus, and the electric power system is configured to perform charge-discharge control of the electric storage device based on information received by the receiving device. Alternatively, an electric power system according to an embodiment of the present disclosure may include the electric storage device according to the present disclosure described herein, and receives supply of electric power from the electric storage device or supplies electric power to the electric storage device from a power generation device or a power network. Alternatively, an electric power system according to an embodiment of the present disclosure may include the electric storage device assembly according to the present disclosure described herein and a receiving device configured to receive information via a network with another device, and the electric storage device assembly is configured to perform charge-discharge control of the electric storage device assembly based on information received by the receiving device. Alternatively, an electric power system according to an embodiment of the present disclosure may include the electric storage device assembly according to the present disclosure described herein, and is configured to receive supply of electric power from the electric storage device assembly or supply electric power to the electric storage device assembly from a power generation device or a power network.

According to embodiments of the present disclosure, an electric storage device, or an electric and electronic apparatus, an electric moving means, and an electric power system including an electric storage device described herein includes a cover member. The cover member is attached to the first surface of the case and covers the first opening, the second opening, the first terminal for external connection, and the second terminal for external connection in a state where the inner surface of the cover member and the first surface of the case are opposite to each other and the connecting portion is fitted to the conduction state switch. Therefore, in this state, it is difficult to access electronic components, and the first terminal for external connection and the second terminal for external connection are not exposed to the outside. Therefore, The security and safety of electric storage device is further improved. In the electric storage device assembly of the present disclosure or the method of assembling the electric storage device assembly according to an embodiment, the order of mounting one electric storage device and another electric storage device adjacent to the one electric storage device on the rack is defined by the cover member, the security and safety of the electric storage device assembly is further improved. It should be understood that the effects described in this specification are merely examples and are not limited to the security and safety improvement, and other suitable properties relating to the present technology may be realized and as further described herein.

DETAILED DESCRIPTION

Figure 1A:
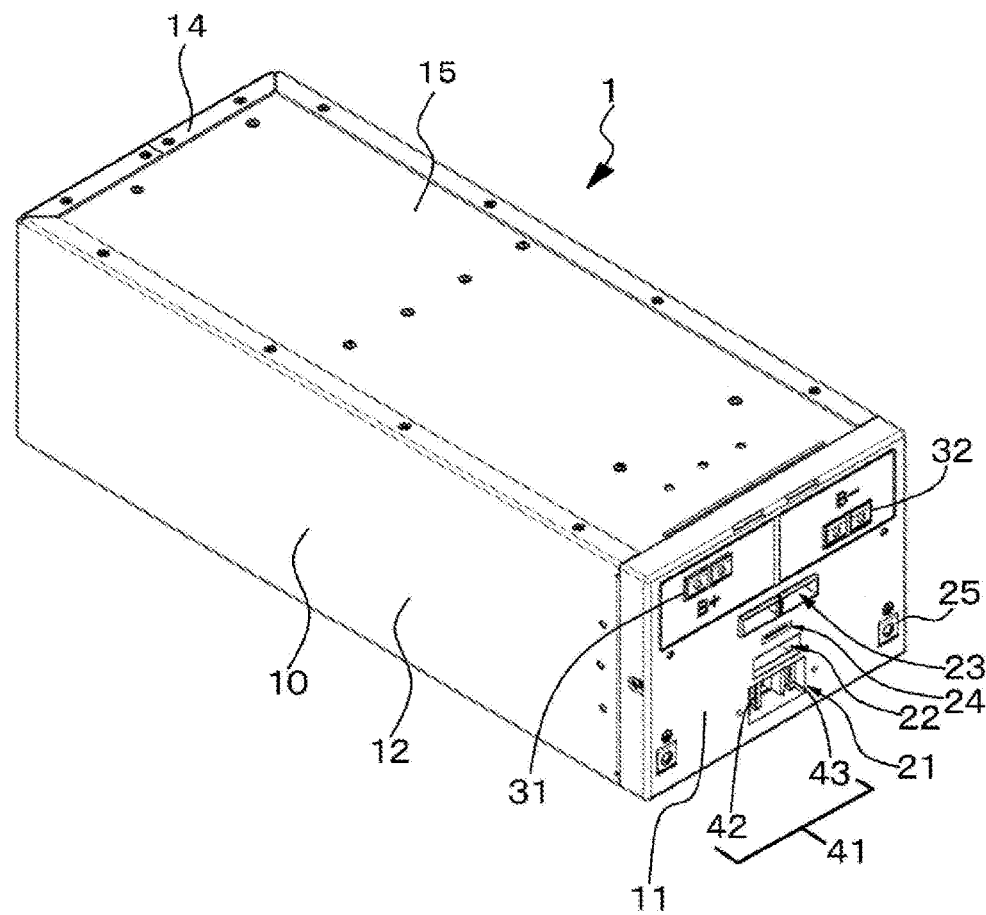
FIG. 1A is a schematic perspective view of an electric storage device in a state where a cover member is removed according to an embodiment.

The present disclosure generally relates to an electric storage device, an electric storage device assembly, an electric and electronic apparatus, an electric moving means and an electric power system, and a method of assembling an electric storage device assembly. Hereinafter, the present disclosure will be described based on examples with reference to the drawings, but the present disclosure is not limited to the examples, and various numerical values and materials in the examples are examples.

According to embodiments of the present disclosure, in an electric storage device assembly of the present disclosure or in an electric storage device assembly in a method of assembling an electric storage device assembly of the present disclosure, a first engaging portion and a second engaging portion can be configured to have a structure in which a first engaging portion in a cover member of an electric storage device on a low-voltage side is engaged with a second engaging portion in a cover member of an electric storage device on a high-voltage side.

In such an embodiment of the electric storage device assembly of the present disclosure or in such an embodiment of the electric storage device assembly in the method of assembling an electric storage device assembly of the present disclosure, it is possible to employ a configuration in which the first engaging portion protrudes from the cover member, and the first engaging portion in the cover member of the electric storage device on the low-voltage side covers the second engaging portion in the cover member of the electric storage device on the high-voltage side when the first engaging portion in the cover member of the electric storage device on the low-voltage side is engaged with the second engaging portion in the cover member of the electric storage device on the high-voltage side.

Alternatively, in such an embodiment of the electric storage device assembly of the present disclosure or in such an embodiment of the electric storage device assembly in the method of assembling an electric storage device assembly of the present disclosure, it is possible to employ a configuration in which the first engaging portion includes a first protruding portion and a first recessed portion, the second engaging portion includes a second recessed portion and a second protruding portion, the first protruding portion of the first engaging portion in the cover member of the electric storage device on the low-voltage side covers the second recessed portion of the second engaging portion in the cover member of the electric storage device on the high-voltage side when the first protruding portion of the first engaging portion in the cover member of the electric storage device on the low-voltage side is engaged with the second recessed portion of the second engaging portion in the cover member of the electric storage device on the high-voltage side, and the second protruding portion of the second engaging portion in the cover member of the electric storage device on the high-voltage side fits in the first recessed portion of the first engaging portion in the cover member of the electric storage device on the low-voltage side when a first recessed portion of the first engaging portion in the cover member of the electric storage device on the low-voltage side is engaged with the second protruding portion of the second engaging portion in the cover member of the electric storage device on the high-voltage side.

In the electric storage device in the electric storage device assembly of the present disclosure including the various preferred embodiments described herein and configurations, the electric storage device in the method of assembling an electric storage device assembly of the present disclosure including the various preferred embodiments described herein and configurations, the electric storage device of the present disclosure, and the electric storage devices in the electric and electronic apparatus, the electric moving means and the electric power system of the present disclosure (hereinafter these may be collectively referred to as "electric storage device and the like of the present disclosure"), it is possible to employ an embodiment in which an engaging portion that engages with an edge portion of a cover member constituting another electric storage device is provided at the edge portion of the cover member.

In the electric storage device and the like of the present disclosure including the preferred embodiments described herein, it is possible to employ a configuration in which a conduction state switching means such as a conduction state switch may include: an internal first terminal that is connected to the first terminal portion of the battery unit and disposed in the case opposite to the first opening; and an internal second terminal that is connected to the first terminal for external connection and disposed in the case opposite to the first opening. The cover member includes a connecting portion and the connecting portion is connected or fitted to the internal first terminal and the internal second terminal.

In the electric storage device and the like of the present disclosure having such a configuration, it is possible to employ a configuration in which the connecting portion according to an embodiment, is formed by bending a plate-like conductive material and has a first leg and a second leg, a first slit portion is provided on an opposing surface of the internal first terminal opposite to the first opening, a second slit portion is provided on an opposing surface of the internal second terminal opposite to the first opening, and the first leg of the connecting portion is inserted into the first slit portion, and the second leg of the connecting portion is inserted into the second slit portion when the connecting portion is fitted to the conduction state switching means. In the case of these configurations, it is possible to employ a configuration in which a fuse is inserted between the first terminal portion of the battery unit and the internal first terminal, between the first terminal for external connection and the internal second terminal, or between the first terminal portion of the battery unit and the internal first terminal and between the first terminal for external connection and the internal second terminal Further, in the electric storage device and the like of the present disclosure including the preferred embodiments and configurations described herein, it is possible to employ a configuration in which the electronic component is a switch device for setting an address of the electric storage device. Furthermore, in the electric storage device and the like of the present disclosure including the preferred embodiments and configurations described herein, it is possible to employ a configuration in which a communication terminal for communication with an external control unit is further provided.

Furthermore, in the electric storage device and the like of the present disclosure including the preferred embodiments and configurations described herein, the electric storage device and the like can have an embodiment to be charged by a power generation device that performs power generation based on renewable energy. Furthermore, in the electric storage device and the like of the present disclosure including the preferred embodiments and configurations, the electric storage device and the like can have an embodiment in which electric power is supplied to the electric and electronic apparatus.

Normally, when a plurality of electric storage devices are connected to be used, a common control circuit (controller) including a processor is provided outside the electric storage device for the plurality of electric storage devices. Then, communication is performed between the electric storage device and the control circuit via the communication terminal as described herein, and charging operation, discharging operation, and the like of each electric storage device are controlled by the control circuit. An address for identification is allocated to each electric storage device in order that the control unit receives information such as voltage from the plurality of electric storage devices and controls each electric storage device. An example of the electronic component in the electric storage device and the like of the present disclosure includes a switch device (for example, a rotary switch) for setting an address of such an electric storage device, as described above. The control unit is also connected to an external device or facility, or is incorporated in an external device or facility.

The battery unit in the electric storage device and the like of the present disclosure includes an electric storage module (also referred to as assembled battery) in which a large number of battery blocks are housed in an outer case. Here, the battery block includes an electric storage module in which a plurality (for examples, 8) of secondary batteries (also referred to as unit batteries, single batteries or cells) are connected in parallel and/or in series. The secondary battery is composed of, for example, a lithium ion battery. In the electric storage device assembly, a large number of electric storage devices are connected in series, or in series and in parallel. The electric storage device assembly is applied to, for example, an electric power storage system combined with a new energy (renewable energy) system such as a solar cell or wind power generation, automobiles, and the like. As an example, an output voltage of one electric storage device is set to several tens of volts. An output voltage of several hundred of volts can be attained by connecting a plurality of such electric storage devices in series, or in series and in parallel. In particular, when such a high voltage is generated as described above, it is necessary to give sufficient consideration to safety as described above. Examples of the secondary battery other than the lithium ion battery include a magnesium ion battery, a metal air secondary battery having a negative electrode containing a negative electrode active material including a metal and an alloy material (examples of the metal and the alloy material that can be used for a negative electrode active material include alkali metals such as lithium, sodium and potassium; group 2 elements such as magnesium and calcium; group 13 elements such as aluminum; transition metals such as zinc and iron; and alloy materials and compounds containing these metals), a lithium-sulfur secondary battery, a sodium-sulfur secondary battery, a sodium-nickel chloride secondary battery, a sodium ion secondary battery, a polyvalent cation secondary battery, various organic secondary batteries, and a nickel-metal hydride secondary battery. Further, the battery unit can also be constituted of an electric double layer capacitor.

The case includes a material having high thermal conductivity and thermal emissivity, such as aluminum, aluminum alloy, copper, or copper alloy. These materials can attain excellent heat dissipation, suppress an increase in temperature in the case, minimize the opening of the case, and achieve high dust-proof properties and drip-proof properties. The case can be manufactured based on sheet-metal processing. The first surface of the case and the cover member can be made of a plastic material having high insulating properties, high flame retardancy and high weather resistance. The first engaging portion and the second engaging portion are formed integrally with the cover member or are separately formed from the cover member and attached to the cover member. In the latter case, the first engaging portion and the second engaging portion may be made of a plastic material having high insulating properties, high flame retardancy and high weather resistance, and these portions can be attached to the cover member by using, for example, bolts and nuts, or can be bonded to the cover member using an adhesive or the like. The first terminal for external connection and the second terminal for external connection can be well-known terminals having a structure capable of being connected to external wiring. The conduction state switching means including the internal first terminal and the internal second terminal may be fabricated by appropriately selecting from a metal material or an alloy material, such as copper, a copper alloy, aluminum or an aluminum alloy, which is relatively inexpensive and has relatively low electric resistance value and good processability.

Further, the connecting portion and the cover member may be integrally formed from the viewpoint of commonality of components, or the connecting portion and the cover member may be formed as separate members according to an embodiment. In the former case, the above-mentioned plate-shaped conductive material formed by bending and having the first leg and the second leg (hereinafter, may be simply referred to as "plate-like conductive material") may be attached to the cover member. In the latter case, the cover member may cover the connecting portion, the first opening, the second opening, the first terminal for external connection and the second terminal for external connection, or the connecting portion may cover the first opening and the covering member may cover the connecting portion, the second opening, the first terminal for external connection and the second terminal for external connection, or the connecting portion may cover the first opening and the second opening and the cover member may cover the connecting portion, the first terminal for external connection and the second terminal for external connection. The connecting portion can be composed of a plastic material having high insulating properties, high flame retardancy and high weather resistance, and the above plate-like conductive material, or the connecting portion can be obtained by plating a plastic material having high insulating properties, high flame retardancy, and high weather resistance with copper layer.

The rack may include a material having enough strength to mount a plurality of electric storage devices, for example, a metal or an alloy. The terminal for communication may be a terminal having a configuration and a structure according to the communication cable to be used.

Specific examples of electric and electronic apparatus include various electronic apparatuses and electric apparatuses such as television receivers, refrigerators, air conditioners, and bath facilities; electric tools such as electric drills and electric saws; network servers; an electric power storage system or a home energy server (household electric storage device) such as a household battery system that stores electric power for emergency etc.; an electric storage unit and a backup power source. In addition, the electric moving means is a moving means that operates (runs) using the electric storage device or the electric storage device assembly as a driving power source, and examples of the electric moving means include electric vehicles such an electric automobile, an electric motorcycle, an electric bicycle, electric vehicles such as Segway (registered trademark); and an aircraft or a ship driven by an electric power driving force converting device (specifically, for example, a power driving motor). In addition, for example, the electric moving means may include an automobile (a hybrid vehicle or the like) having a driving source other than a secondary battery.

Figure 1B:
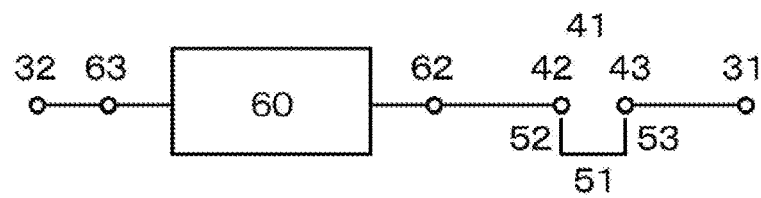
FIG. 1B is a principle diagram of the electric storage device.
Figure 2:
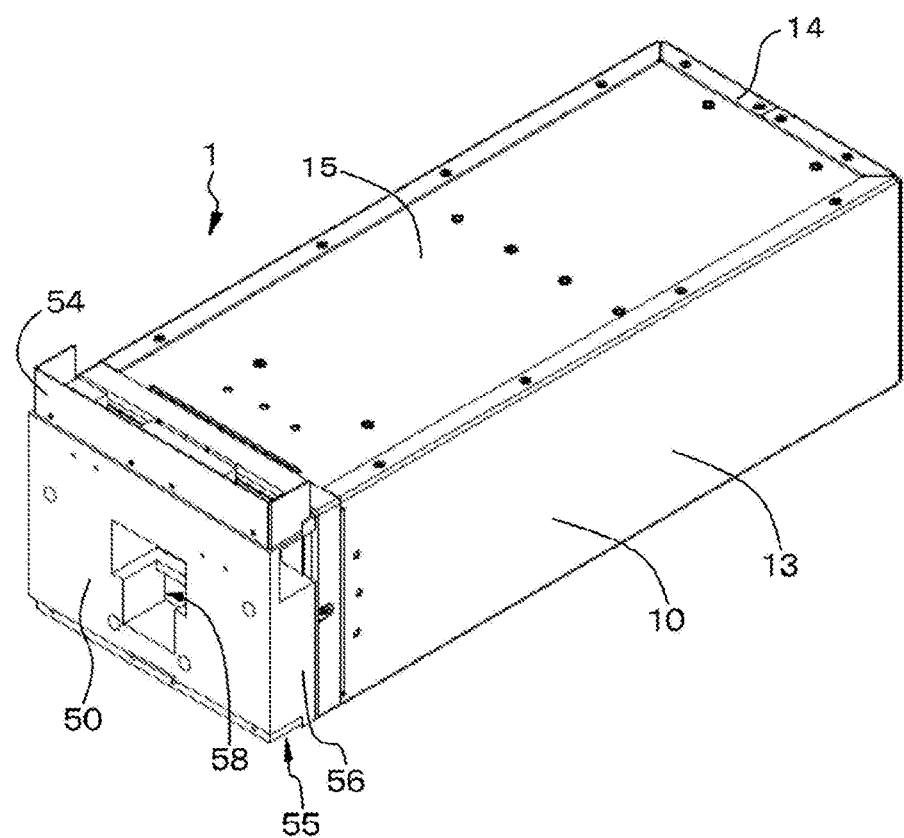
FIG. 2 is a schematic perspective view of the electric storage device according to an embodiment.
Figure 3:
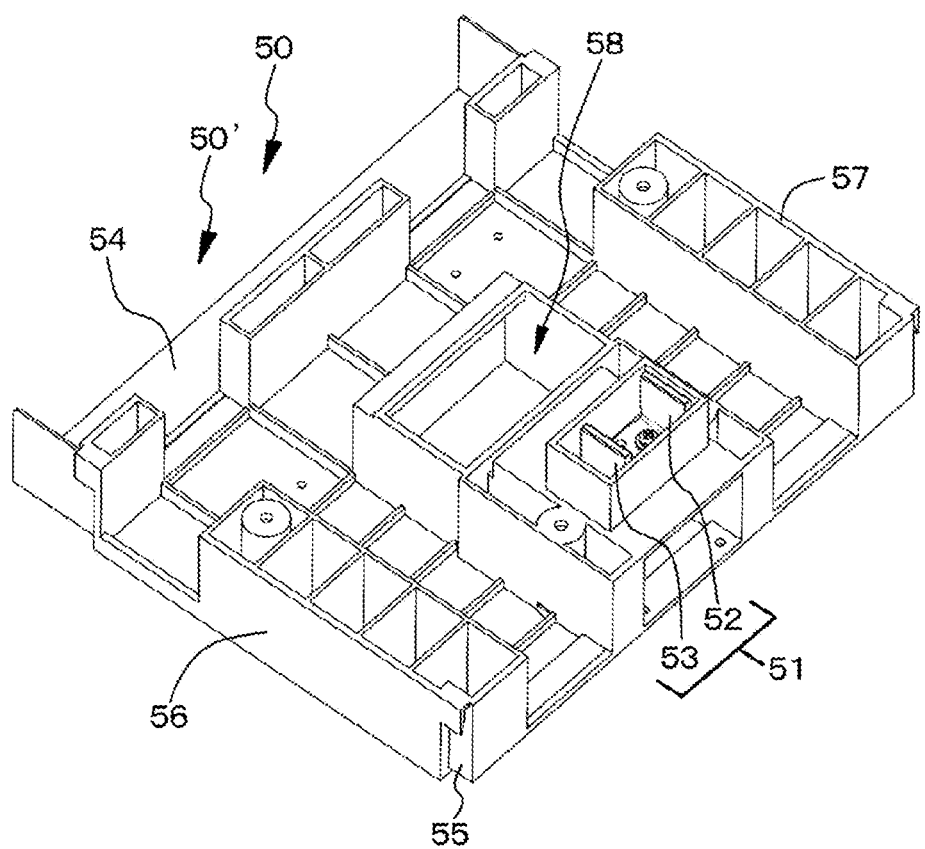
FIG. 3 is a schematic perspective view of an inner surface of the cover member of the electric storage device according to an embodiment.
Figure 4:
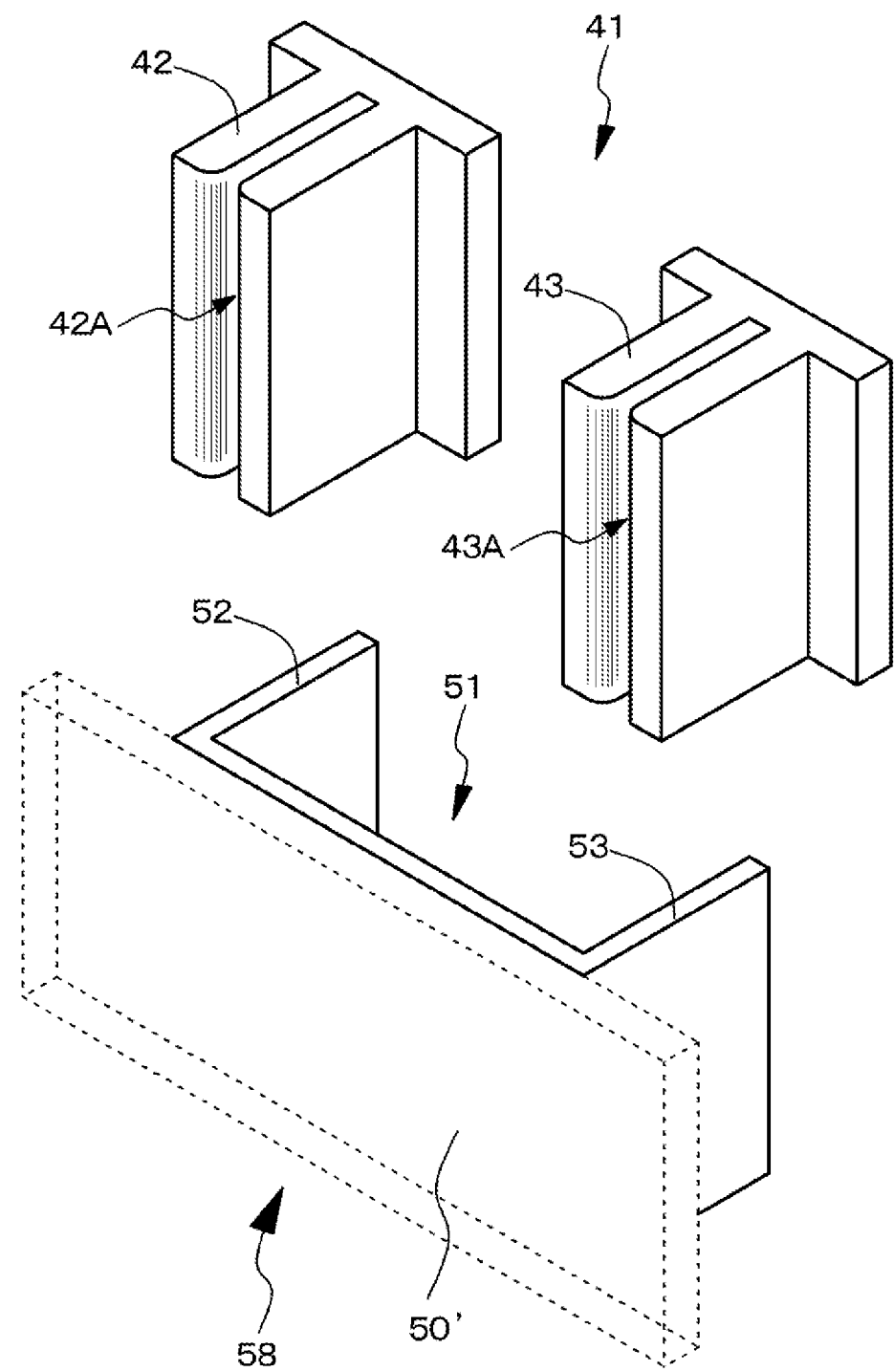
FIG. 4 is a schematic perspective view showing a conduction state switch and a connecting portion in an enlarged manner according to an embodiment.
Figure 5:
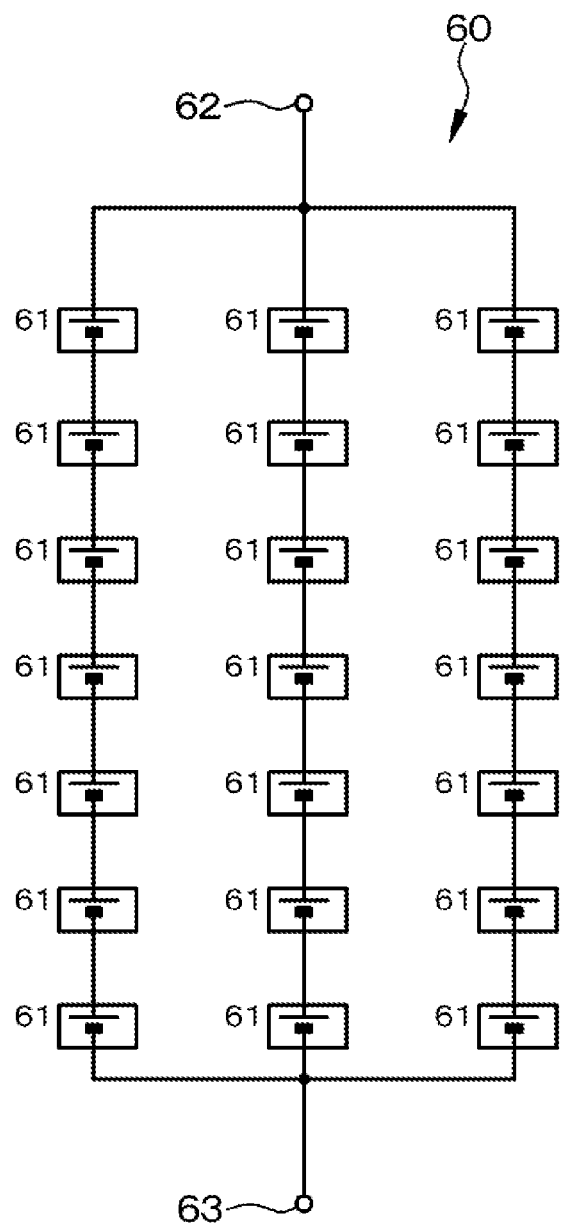
FIG. 5 is a conceptual diagram of a secondary battery in a battery unit according to an embodiment.

Example 1 relates to an electric storage device according to an embodiment of the present disclosure. FIG. 1A shows a schematic perspective view of an electric storage device in Example 1 in a state where a cover member is removed, and FIG. 1B shows a principle diagram of the electric storage device, FIG. 2 shows a schematic perspective view of the electric storage device, and FIG. 3 shows a schematic perspective view of an inner surface (inside surface) of the cover member of the electric storage device. FIG. 4 shows a schematic perspective view showing a conduction state switching means and a connecting portion is shown in an enlarged manner, FIG. 5 shows a conceptual diagram of a secondary battery constituting a battery unit, and FIG. 6A, FIG. 6B and FIG. 6C each show a conceptual diagram of the electric storage device showing dispositions of fuses and the like.

The electric storage device 1 of Example 1 includes for example:

(a) a case 10 that accommodates a battery unit 60 provided with a first terminal portion (for example, a positive electrode terminal portion) 62 and a second terminal portion (for example, a negative electrode terminal portion) 63, and that is provided with a first opening 21 and a second opening 22 on a first surface 11 of the case;

(b) an first terminal for external connection 31 disposed on the first surface 11 of the case 10;

(c) a second terminal for external connection 32 disposed on the first surface 11 of the case 10 and connected to the second terminal portion 63 of the battery unit 60;

(d) a conduction state switching means 41 that is, in the case 10, disposed between the first terminal portion 62 of the battery unit 60 and the first terminal for external connection 31 and that is opposite to the first opening 21, and that brings a portion between the first terminal portion 62 of the battery unit 60 and the first terminal for external connection 31 into a conducting state or a non-conducting state;

(e) an electronic component (not shown) that is, in the case 10, disposed opposite to the second opening 22, and can be accessed from outside; and (f) a cover member 50 having a connecting portion 51 that is provided on an inner surface (inside surface) 50' opposite to the first surface 11 of the case 10 and brings the conduction state switching means 41 into a conducting state or a non-conducting state.

Then, in a state where the inner surface 50' of the cover member 50 and the first surface 11 of the case 10 are opposite to each other and the connecting portion 51 is fitted to the conduction state switching means 41, the cover member 50 is attached to the first surface 11 of the case 10 and covers the first opening 21, the second opening 22, the first terminal for external connection 31 and the second terminal for external connection 32. Specifically, the cover member 50 is screwed to the first surface 11 of the case 10.

Engaging portions 54 and 55 that each engage with an edge portion of a cover member 50 constituting another electric storage device are provided at edge portions of the cover member 50. Specifically, at an upper edge portion of the cover member 50, the engaging portion 54 is provided which engages with an engaging portion 55 facing a lower edge portion of the cover member 50 constituting another electric storage device. In addition, reference numerals 56 and 57 each indicate a side wall of the cover member 50. Specifically, the first engaging portion 54 of the electric storage device-A protrudes from the cover member 50 at the upper end portion of the cover member 50. When the first engaging portion 54 is engaged with the second engaging portion 55 of the electric storage device-B, the first engaging portion 54 in the cover member 50 of the electric storage device-A covers the second engaging portion 55 in the cover member 50 of the electric storage device-B.

Further, the conduction state switching means 41 may include a conduction state switch including an internal first terminal 42 that is connected to the first terminal portion 62 of the battery unit 60 and disposed in the case 10 opposite to the first opening portion 21; and an internal second terminal 43 that is connected to the first terminal for external connection 31 and disposed in the case 10 opposite to the first opening 21; and a connecting portion 51 is fitted to the internal first terminal 42 and the internal second terminal 43 according to an embodiment.

Here, the connecting portion 51 may be formed by bending a plate-shaped conductive material and has a first leg 52 and a second leg 53. That is, the outer shape of the connecting portion 51 is substantially in a "U" shape, one horizontal bar on the upper side of the letter "U" corresponds to the first leg portion 52, and the other horizontal bar on the lower side of the letter "U" corresponds to the second leg portion 53. The connecting portion 51 (specifically, a portion of the connecting portion 51 corresponding to a vertical bar of the letter U) is screwed to the inner surface 50' of the cover member 50 (more specifically, a bottom surface of an opening 58 described later). In FIG. 4, a part of the inner surface 50' is indicated by a dotted line. A first slit portion 42A is provided on the opposing surface of the internal first terminal 42 opposite to the first opening 21, and a second slit portion 43A is provided on the opposing surface of the internal second terminal 43 opposite to the first opening 21. Each of the internal first terminal 42 and the internal second terminal 43 is screwed to the first surface 11 of the case 10. The first leg 52 of the connecting portion 51 is inserted into the first slit portion 42A, and the second leg 53 of the connecting portion 51 is inserted into the second slit portion 43A when the connecting portion 51 is fitted to the conduction state switching means 41.

Figure 6A:
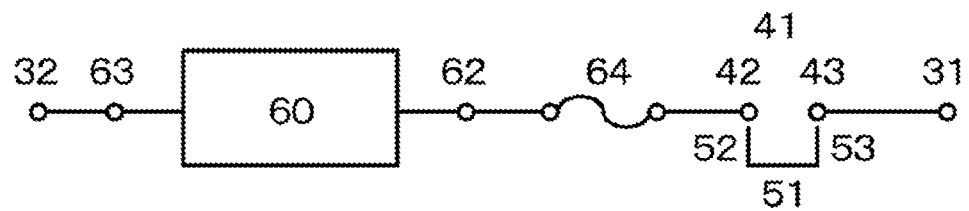
FIG. 6A, FIG. 6B, and FIG. 6C are conceptual diagrams of the electric storage device showing dispositions of fuses and the like, respectively according to an embodiment.
Figure 6B:
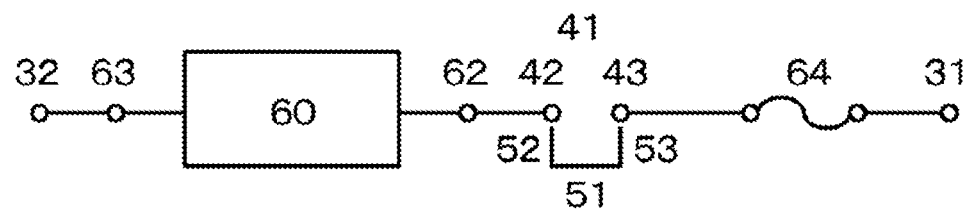
Figure 6C:
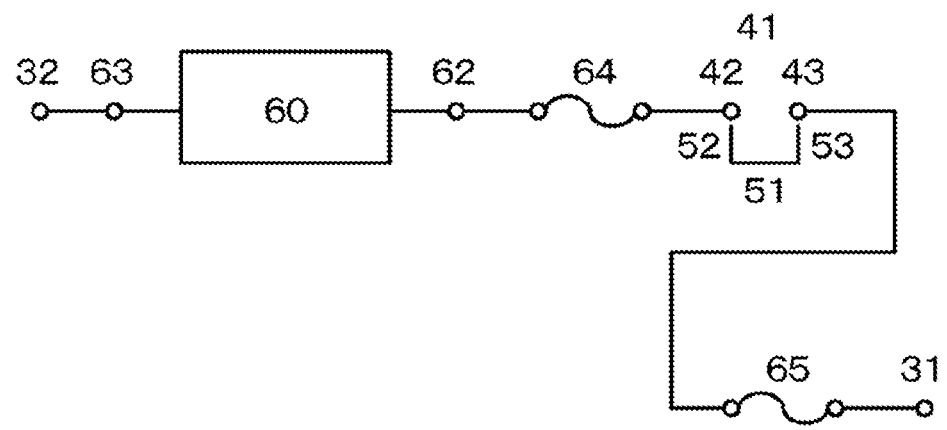

As the conceptual diagrams are shown in FIGS. 6A, 6B, and 6C, fuses 64 and 65 are inserted between the first terminal portion 62 of the battery unit 60 and the internal first terminal 42 (see FIG. 6A), between the first terminal for external connection 31 and the internal second terminal 43 (see FIG. 6B), or between the first terminal portion 62 of the battery unit 60 and the internal first terminal 42 and between the first terminal for external connection 31 and the internal second terminal 43 (See FIG. 6C).

An opening 58 is provided in a substantially central portion of the cover member 50. A communication terminal (not shown) for communication with an external control unit is provided at the bottom of a recessed portion 23 on the first surface 11 of the case 10 opposite to the opening 58. The terminal for communication may be a terminal having a configuration and a structure according to a communication cable to be used. In addition, a plurality of light emitting elements (specifically, a plurality of LEDs different in emission color, but not shown) are disposed at the bottom of a recessed portion 24 on the first surface 11 of the case 10 opposite to the opening 58 so that the operating state of the electric storage device 1 can be seen. Specifically, for example, when the green LED is lit, it indicates that the electric storage device is operating normally, and when the red LED is lit, an abnormality has occurred in the electric storage device. Even in a state where the cover member 50 is attached to the first surface 11 of the case 10, it is possible to access the communication terminal from the outside, and it is possible to visually recognize the LED from the outside.

The electronic component (not shown) includes, for example, a switch device (specifically, a rotary switch) for setting an address of the electric storage device 1, a slide switch, and a JTAG (Joint Test Action Group) connector. The slide switch is used in order to increase the address specified by the rotary switch. Through the JTAG connector, test data is inputted and outputted for inspection of MPU, IC etc. constituting a control part housed inside the case, and the firmware of MPU can be rewritten. Switching components, connectors, and the like may be used as the electronic components. An earth terminal 25 is provided on the first surface 11 of the case 10.

As described herein, on the first surface 11 of the case 10, the communication terminal, the plurality of light emitting elements, the electronic components, and the conduction state switching means 41 are arranged from the upper end side to the lower end side of the first surface 11; however, the arrangement is not limited to this.

The side surfaces 12, 13, 14, the top plate 15, and the bottom plate (not shown) of the case 10 are manufactured based on sheet-metal processing from a material having high thermal conductivity and thermal emissivity, for example, aluminum. In addition, the first surface 11 of the case 10 and the cover member 50 are made of a plastic material having high insulating properties, high flame retardancy and high weather resistance, for example, polycarbonate (PC). As shown in FIG. 3, a large number of reinforcing portions are provided on the inner surface 50' of the cover member 50, but a detailed description of the reason will be omitted. The first engaging portion 54 and the second engaging portion 55 are formed integrally with the cover member 50. The first terminal for external connection 31 and the second terminal for external connection 32 are each composed of a well-known terminal having a structure capable of being connected to external wiring. The conduction state switching means 41 (the internal first terminal 42 and the internal second terminal 43) and the connecting portion 51 are made of a metal material or an alloy material such as copper, copper alloy, aluminum, or aluminum alloy, which is relatively inexpensive and has low electric resistance value.

The battery unit 60 includes an electric storage module (assembled battery) in which a large number of battery blocks are housed in an outer case. The battery block is composed of an electric storage module in which a plurality (seven in the example shown in FIG. 5) of secondary batteries (also referred to as unit batteries, single batteries or cells) 61 are connected in parallel and/or in series. The secondary battery 61 is composed of, for example, a lithium ion battery. In FIG. 5, in order to simplify the drawing, the battery unit 60 is illustrated as having the secondary batteries 61 arranged therein.

The electric storage device of Example 1 described herein is charged by a power generation device which performs power generation based on renewable energy. This will be described in detail in Example 4. Alternatively, the electric storage device of Example 1 described above supplies electric power to the electric and electronic apparatus. In other words, the electric and electronic apparatus has the electric storage device of Example 1 or an electric storage device of Example 2 described later or an electric storage device assembly of Example 3 described later, and receives supply of electric power from the electric storage device of Example 1 or an electric storage device of Example 2 described later or an electric storage device assembly of Example 3 described later. Specific examples of such electric and electronic apparatuses, facilities, apparatuses, devices, etc. may include various electronic apparatuses and electric apparatuses such as television receivers, refrigerators, air conditioners, and bath facilities; electric tools such as electric drills and electric saws; network server; an electric power storage system or a home energy server (household electric storage device) such as a household battery system that stores electric power for emergency etc.; an electric storage unit and a backup power source; and a power source for electric power frequency adjustment, and the electric and electronic apparatus may be connected to the electric storage device or the electric storage device assembly by a well-known method.

A control part (not shown) for monitoring the voltage, current, and temperature of the battery unit 60 (secondary battery 61) is provided in the electric storage device 1. Information from the control part is transmitted to a control circuit including a processor (not shown) disposed outside. The control circuit is configured to perform charge management, discharge management, management for deterioration suppression, and the like.

For example, a serial interface is used for communication between the control part of the electric storage device 1 and the control unit via the communication terminal. Examples of the serial interface include I²C (Inter-Integrated Circuit) method, SM bus (System Management Bus), CAN (Controller Area Network), and SPI (Serial Peripheral Interface).

In the electric storage device 1 of Example 1, in a state where the cover member 50 is attached to the first surface 11 of the case 10, the cover member 50 covers the second opening 22 located in front of the operation surface of the electronic component. Thus, even when the first terminal portion 62 of the battery unit 60 and the first terminal for external connection 31 are in a conductive state, access to the electronic component is blocked. On the other hand, in a state where the cover member 50 is not attached to the first surface 11 of the case 10, the second opening 22 located in front of the operation surface of the electronic component is in an open state. Therefore, it is possible to set the address of the electric storage device 1, for example, by operating the operation surface of the electronic component via the second opening portion 22. By performing the setting operation from the outside of the case 10, the operability can be improved and the safety can be heightened as compared with the case where the electronic component is operated inside the case 10. In particular, when a plurality of electric storage devices are connected in series, the potential of the internal circuit of the electric storage device on the high-voltage side becomes higher as a whole than the potential of the internal circuit of the electric storage device on the low-voltage side, but since the setting operation can be performed from the outside of the case 10, it is possible to improve safety.

As described herein, in the electric storage device of Example 1, the cover member is attached to the first surface of the case and covers the first opening, the second opening, the first terminal for external connection and the second terminal for external connection in a state where the inner surface of the cover member and the first surface of the case are opposite to each other, and the connecting portion is fitted to the conduction state switching means. Therefore, in this state, since it is impossible to access the electronic component, and further, since the first terminal for external connection and the second terminal for external connection are not exposed to the outside, it is possible to impart extremely high safety to the electric storage device.

Figure 7:
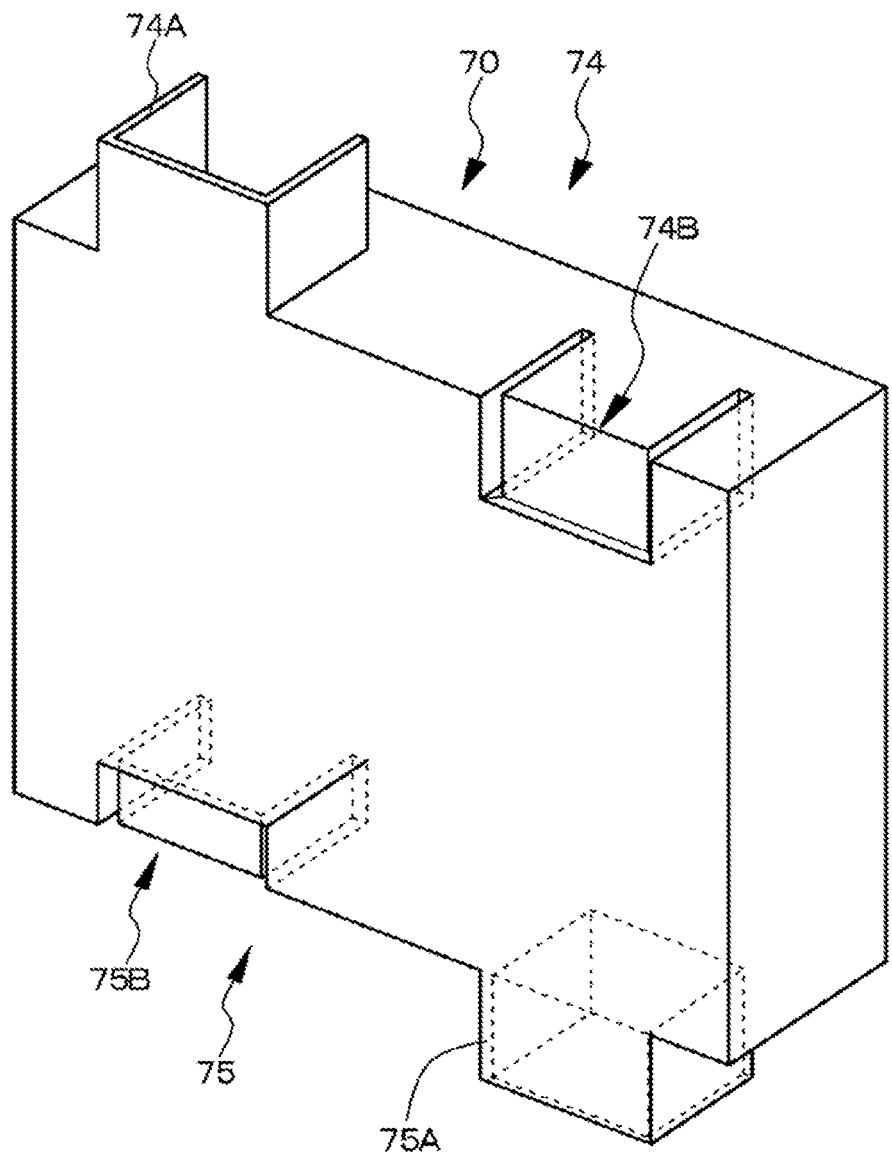
FIG. 7 is a schematic perspective view of a cover member in an electric storage device according to an embodiment.

Example 2 is a variation of Example 1, and shapes of a first engaging portion 74 and a second engaging portion 75 are different from the first engaging portion and the second engaging portion of Example 1. FIG. 7 shows a schematic perspective view of a cover member in an electric storage device of Example 2. In addition, also in Example 2, an opening similar to the opening 58 of Example 1 is provided in a substantially central portion of the cover member, but this opening portion is omitted in FIG. 7.

In the electric storage device of Example 2, the first engaging portion 74 includes a first protruding portion 74A and a first recessed portion (first groove portion) 74B, and the second engaging portion 75 includes a second recessed portion (second groove) 75B and a second protruding portion 75A. When the first protruding portion 74A of the first engaging portion 74 in a cover member 70 of the electric storage device on a low-voltage side (electric storage device-A) is engaged with the second recessed portion 75B of the second engaging portion 75 in the cover member 70 of the electric storage device on a high-voltage side (electric storage device-B), the first protruding portion 74A of the first engaging portion 74 in the cover member 70 of the electric storage device-A covers the second recessed portion 75B of the second engaging portion 75 in the cover member 70 of the electric storage device-B. When the second recessed portion 74B of the first engaging portion 74 in the cover member 70 of the electric storage device-A is engaged with the second protruding portion 75A of the second engaging portion 75 in the cover member 70 of the electric storage device-B, the second protruding portion 75A of the second engaging portion 75 in the cover member 70 of the electric storage device-B fits in the first recessed portion 74B of the first engaging portion 74 in the cover member 70 of the electric storage device-A.

The first protruding portion 74A of the first engaging portion 74 has an outer shape of a substantially U-shape, and the second recessed portion 75B of the second engaging portion 75 has a shape substantially complementary to the first protruding portion 74A of the first engaging portion 74. Further, the first protruding portion 75A of the second engaging portion 75 also has an outer shape of a substantially U-shape, and the first recessed portion 74B of the first engaging portion 74 has a shape substantially complementary to the second protruding portion 75A of the second engaging portion 75. The first protruding portion 74A and the second recessed portion 75B are in a male-female relationship, and both the second protruding portion 75A and the first recessed portion 74B are also in a male-female relationship.

Except for the above, the configuration and structure of the electric storage device of Example 2 can be adapted to have the same configuration and structure as in the electric storage device described in Example 1, and therefore detailed description will be omitted.

Figure 8:
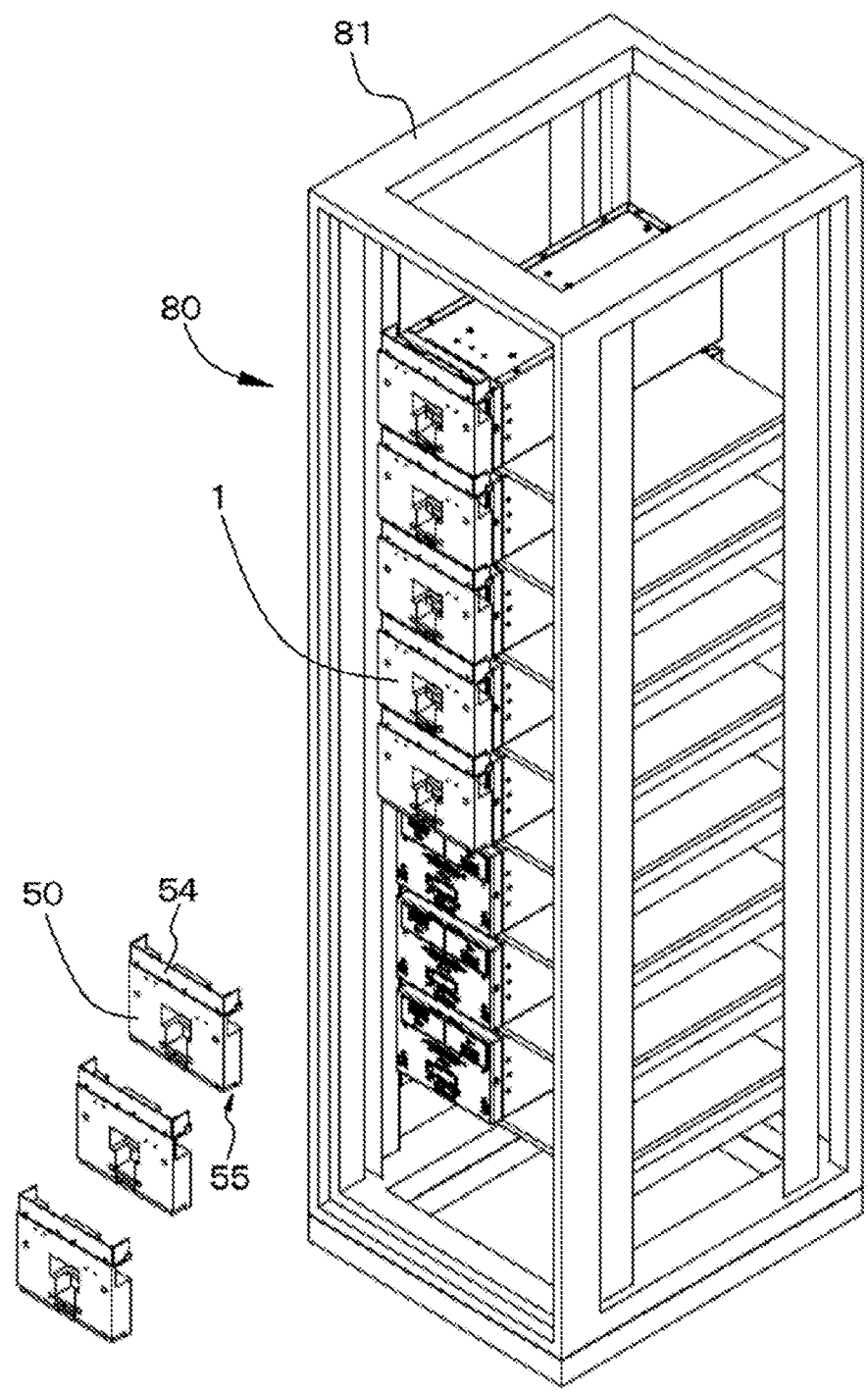
FIG. 8 is a schematic view showing a state where an electric storage device in an electric storage device assembly is mounted on a rack according to an embodiment.
Figure 10:
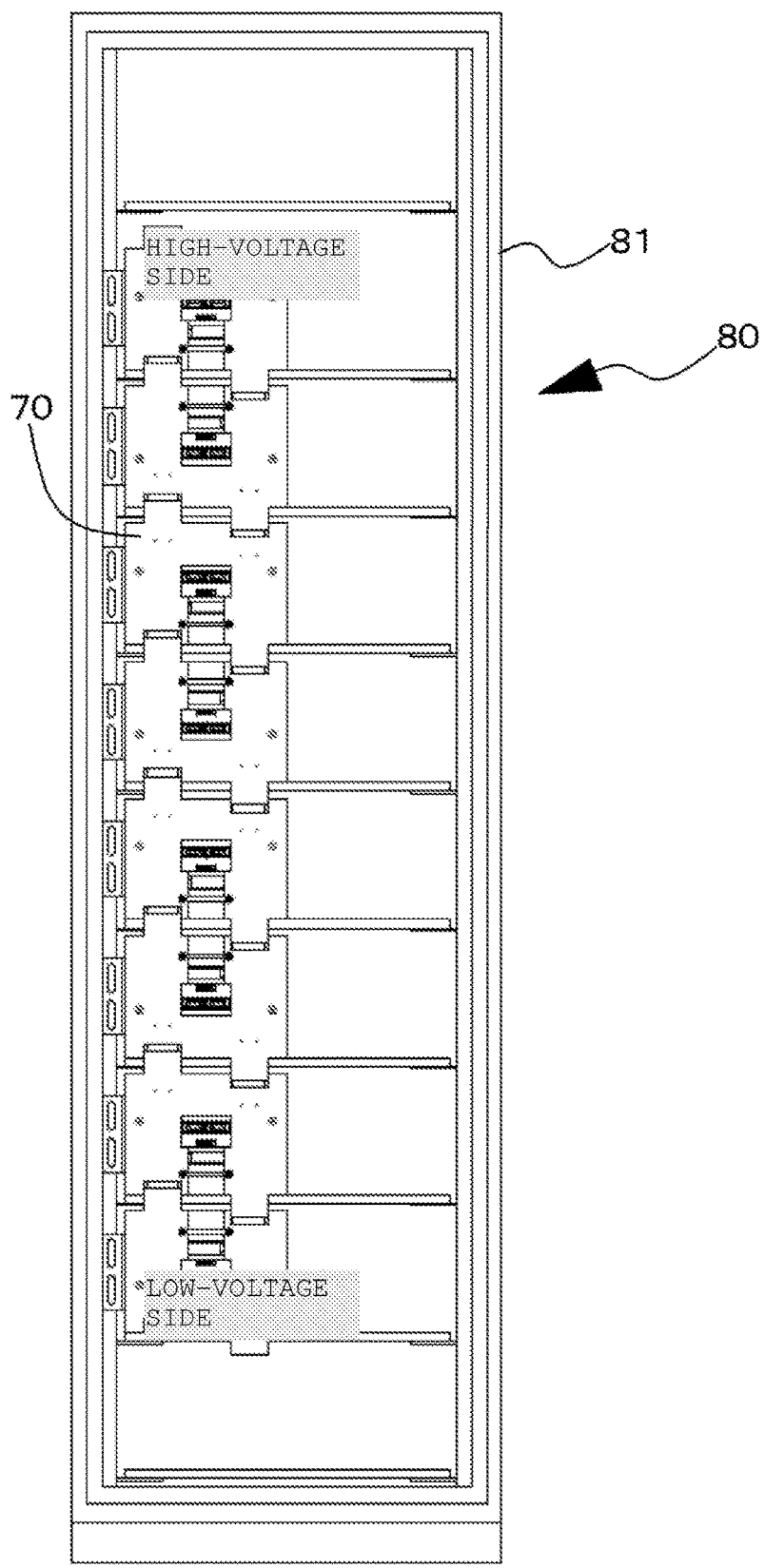
FIG. 10 is a schematic view (front view) showing a state where an electric storage device in a variation of the electric storage device assembly is mounted on a rack according to an embodiment.
Figure 11:
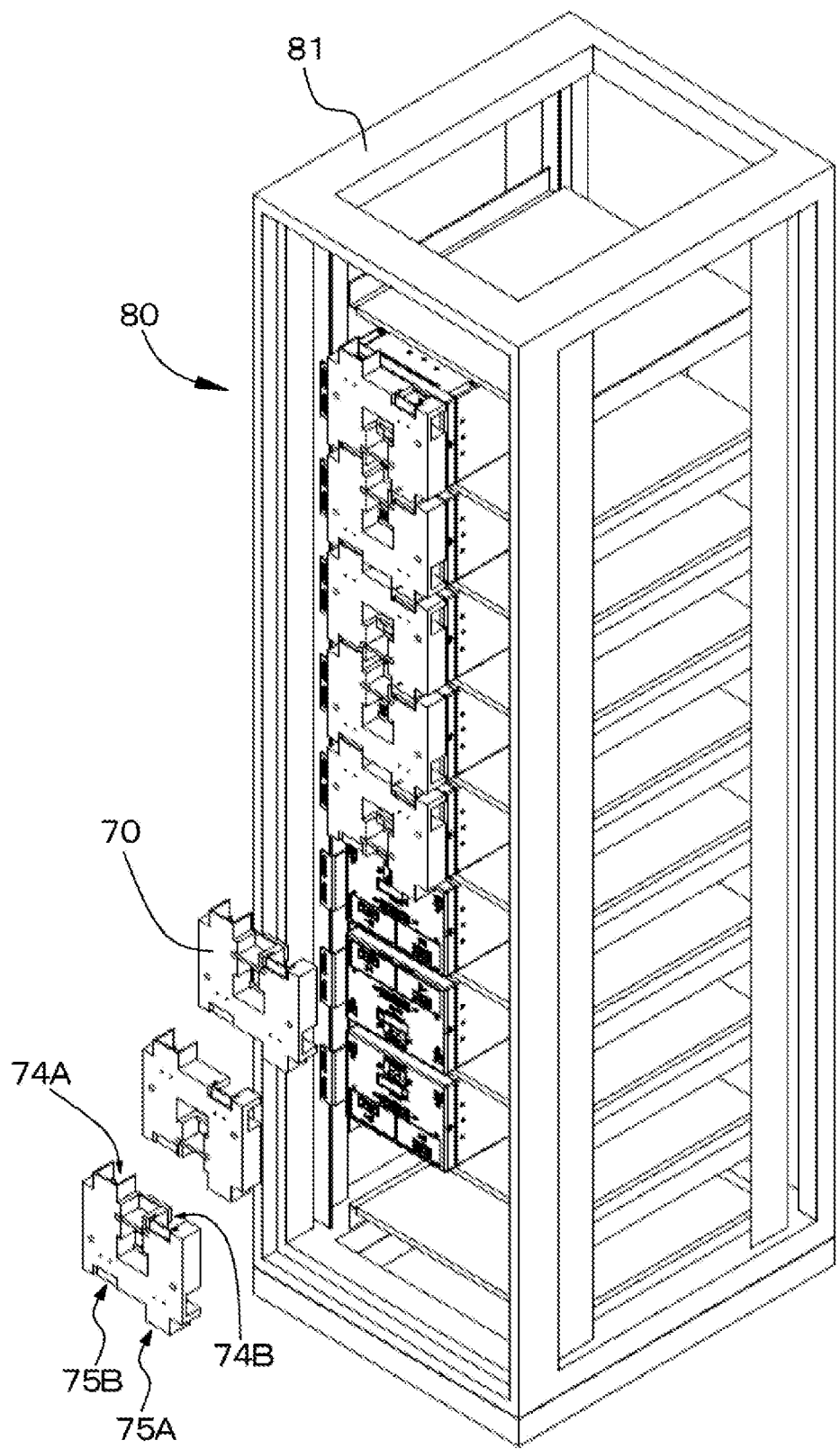
FIG. 11 is a schematic view showing a state where the electric storage device in the variation of the electric storage device assembly is mounted on a rack according to an embodiment.

Example 3 relates to the electric storage device assembly of the present disclosure and the method of assembling an electric storage device assembly of the present disclosure according to an embodiment. In the electric storage device assembly of Example 3, a plurality of the electric storage devices described in Example 1 or Example 2 are incorporated. FIG. 8 shows a schematic view showing a state where an electric storage device in the electric storage device assembly of Example 3 is mounted on a rack, and FIG. 9A and FIG. 9B each show a conceptual diagram showing a state where the electric storage device in the electric storage device assembly of Example 3 is mounted on a rack. FIG. 10 shows a schematic view (front view) showing a state where an electric storage device in a variation of the electric storage device assembly of Example 3 is mounted on a rack, and FIG. 11 shows a schematic view showing a state where the electric storage device in the variation of the electric storage device assembly of Example 3 is mounted on a rack.

An electric storage device assembly 80 of Example 3 includes a plurality of electric storage devices 1 and a metal rack 81 on which the plurality of electric storage devices 1 are mounted (attached). Each of the electric storage devices 1 is composed of the electric storage device described in Example 1 or Example 2. Here, in the same manner as described in Example 1, in the electric storage device 1, the cover member 50 is attached to the first surface 11 of the case 10 and covers the first opening 21, the second opening 22, the first terminal for external connection 31 and the second terminal for external connection 32 in a state where the inner surface 50' of the cover member 50 and the first surface 11 of the case 10 are opposite to each other, and the connecting portion 51 is fitted to the conduction state switching means 41. The first engaging portion 54 and the second engaging portion 55 are provided at the edge portion of the cover member 50, and the first engaging portion 54 in the cover member 50 of one electric storage device is engaged with the second engaging portion 55 in the cover member 50 of an electric storage device adjacent to the one electric storage device. In addition, a control unit is also mounted on the rack 81, but illustration of the control unit is omitted.

Specifically, the first engaging portion 54 and the second engaging portion 55 has a structure in which the first engaging portion 54 in the cover member 50 of the electric storage device on the low-voltage side (electric storage device-A) is engaged with the second engaging portion 55 in the cover member 50 of the electric storage device on the high-voltage side (electric storage device-B).

More specifically as shown in FIGS. 8 and 9, similarly to Example 1, when the first engaging portion 54 in the cover member 50 of the electric storage device-A is engaged with the second engaging portion 55 in the cover member 50 of the electric storage device-B, the first engaging portion 54 protrudes from the cover member 50, and the first engaging portion 54 in the cover member 50 of the electric storage device-A covers the second engaging portion 55 in the cover member 50 of the electric storage device-B.

Alternatively, more specifically as shown in FIGS. 10 and 11, similarly to Example 2, the first engaging portion 74 includes the first protruding portion 74A and the first recessed portion (first groove) 74B, the second engaging portion 75 includes the second recessed portion (second groove) 75B and the second protruding portion 75A, and when the first protruding portion 74A of the first engaging portion 74 in the cover member 70 of the electric storage device-A is engaged with the second recessed portion 75B of the second engaging portion 75 in the cover member 70 of the electric storage device-B, the first protruding portion 74B of the first engaging portion 74 in the cover member 70 of the electric storage device-A covers the second recessed portion 75B of the second engaging portion 75 in the cover member 70 of the electric storage device-B. When the second recessed portion 74B of the first engaging portion 74 in the cover member 70 of the electric storage device-A is engaged with the second protruding portion 75A of the second engaging portion 75 in the cover member 70 of the electric storage device-B, the second protruding portion 75A of the second engaging portion 75 in the cover member 70 of the electric storage device-B fits in the first recessed portion 74B of the first engaging portion 74 in the cover member 70 of the electric storage device-A.

By configuring and structuring the first engaging portions 54, 74 and the second engaging portions 55, 75 in this way, the electric storage devices can be mounted on the rack only in the order of the electric storage device-B and the storage device-A (that is, order from the electric storage device on the high-voltage side to the electric storage device on the low-voltage side), and the electric storage devices can be removed from the rack only in the order of the electric storage device-A and the storage device-B (that is, order from the electric storage device on the low-voltage side to the electric storage device on the high-voltage side). Therefore, it is possible to impart high safety to the assembling of the electric storage device assembly.

In an embodiment, a method of assembling the electric storage device assembly of Example 3 including the electric storage device 1 described in Example 1 or Example 2 will be described. Here, it is assumed that one or more electric storage devices are already mounted on the rack 81. In the examples shown in FIG. 8 and FIG. 11, there is shown a state where the assembling of five electric storage devices to the electric storage device assembly has already been completed, and three electric storage devices are now attached to the electric storage device assembly.

[Step 300]

First, the electric storage device on the low-voltage side (electric storage device-A) is mounted with the cover members 50, 70 removed on the rack 81 next to the electric storage device-B mounted (attached) on the rack. It is to be noted that FIG. 8 and FIG. 11 show that three electric storage devices are in this state.

[Step 310]

Next, the second terminal for external connection 32 of the electric storage device-B is electrically connected (wired) to the first terminal for external connection 31 of the electric storage device-A. In the illustrated example, the electric storage devices are connected in series, but it is also possible to connect the electric storage devices in series and in parallel to the electric storage device assembly according to the specifications.

[Step-320]

Figure 9A:
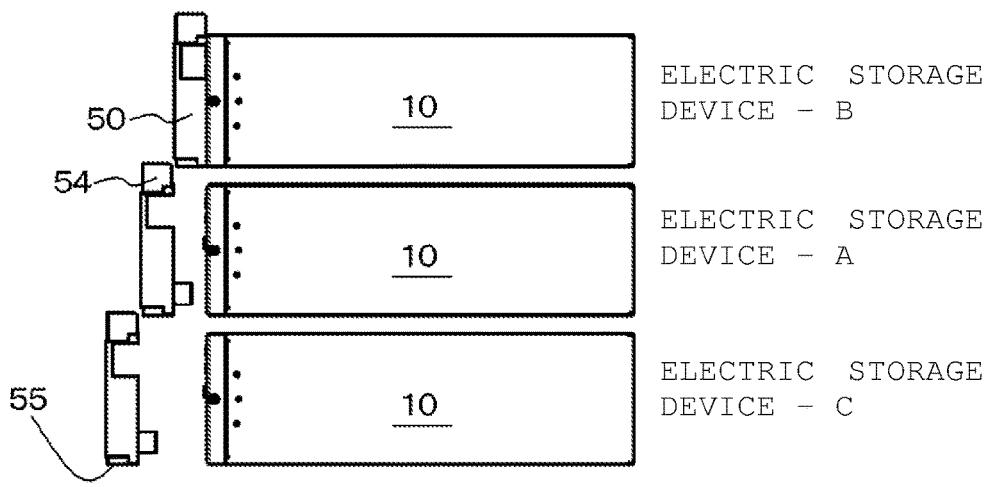
FIG. 9A and FIG. 9B are conceptual diagrams showing a state where the electric storage device in the electric storage device assembly is mounted on a rack according to an embodiment.
Figure 9B:
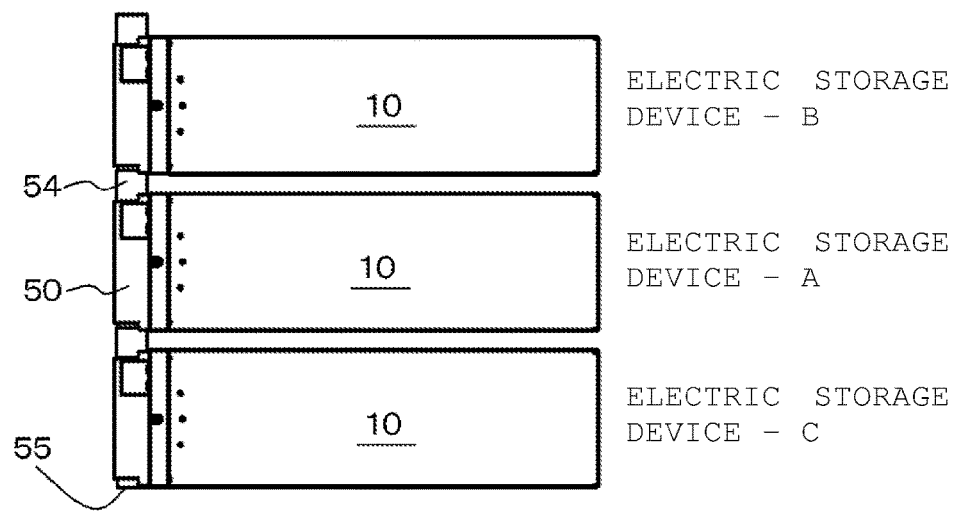

Thereafter, the cover members 50, 70 are attached to the case 10 so that the first engaging portions 54, 74 in the cover members 50, 70 of the electric storage device-A are engaged with the second engaging portions 55, 75 in the cover members 50, 70 of the electric storage device-B, the inner surface 50' of the cover members 50, 70 in the electric storage device-A and the first surface 11 of the case 10 are opposite to each other, and the connecting portion 51 is fitted to the conduction state switching means 41, to cover the first opening 21, the second opening 22, the first terminal for external connection 31 and the second terminal for external connection 32 with the cover members 50, 70 (see FIG. 9A and FIG. 9B).

By executing [Step 300], [Step 310], and [Step 320] in one electric storage device and repeating these [Step 300], [Step 310] and [Step 320], all of the electric storage devices may be attached to the rack 81 to complete the assembling of the electric storage device assembly. Alternatively, [Step 300] may be executed for two or more electric storage devices (maximum, all electric storage devices to be mounted on the rack 81), then [Step 310] may be executed for all of these electric storage devices, and then [Step 320] may be executed for all of these resulting electric storage devices. Alternatively, [Step 300] may be executed for two or more electric storage devices (maximum, all electric storage devices to be mounted on the rack 81), then [Step 310] and [Step 320] may be executed for the appropriate number of electric storage devices among these electric storage devices, and [Step 310] and [Step 320] may be repeated to complete the assembling of the electric storage device assembly.

In the electric storage device assembly of Example 3 or the method of assembling the same, not only extremely high safety of the electric storage devices of Examples 1 and 2 is imparted but also the first engaging portion in the cover member of the electric storage device-A is engaged with the second engaging portion in the cover member of the electric storage device-B, and therefore the order in which the electric storage device-A and the electric storage device-B are mounted on the rack (attaching order) is defined by the cover member. Accordingly, it is possible to impart extremely high safety to the electric storage device assembly.

Before the connecting portion is connected or fitted to the conduction state switching means, in order to prevent a short circuit of the conduction state switching means, an insulating material member having the same shape as the connecting portion may be fitted to the conduction state switching means, and the assembling of the electric storage device assembly may be performed. Further, in the electric storage device assembly of Example 3, the electric storage devices are arranged in the vertical direction; however, the arrangement direction of the electric storage devices is not limited to the vertical direction, and the electric storage devices may be arranged in a horizontal direction (lateral direction), or in a direction of a combination of the vertical direction and the horizontal direction.

Example 4 relates to the electric storage devices of Examples 1 and 2, and to the electric storage device assembly of Example 3. An electric storage device (or electric storage device assembly) in Example 4 is charged by a power generation device that performs power generation based on renewable energy, and supplies electric power to an electric and electronic apparatus.

Furthermore, an electric and electronic apparatus of Example 4 includes the electric storage device of Example 1 or Example 2 (or the electric storage device assembly of Example 3), and receives supply of electric power from the electric storage device of Example 1 or Example 2 (or the electric storage device assembly of Example 3). Further, an electric power system of Example 4 includes the electric storage device of Example 1 or Example 2 (or the electric storage device assembly of Example 3) and a receiving unit for receiving information via a network with another device, and performs charge-discharge control of the electric storage device (or electric storage device assembly) based on information received by the receiving unit. Alternatively, the electric power system of Example 4 includes the electric storage device of Example 1 or Example 2 (or the electric storage device assembly of Example 3) and receives supply of electric power from the electric storage device of Example 1 or Example 2 (or the electric storage device assembly of Example 3), or supplies electric power to the electric storage device of Example 1 or Example 2 (or the electric storage device assembly of Example 3) from a power generation device or a power network.

Figure 12:
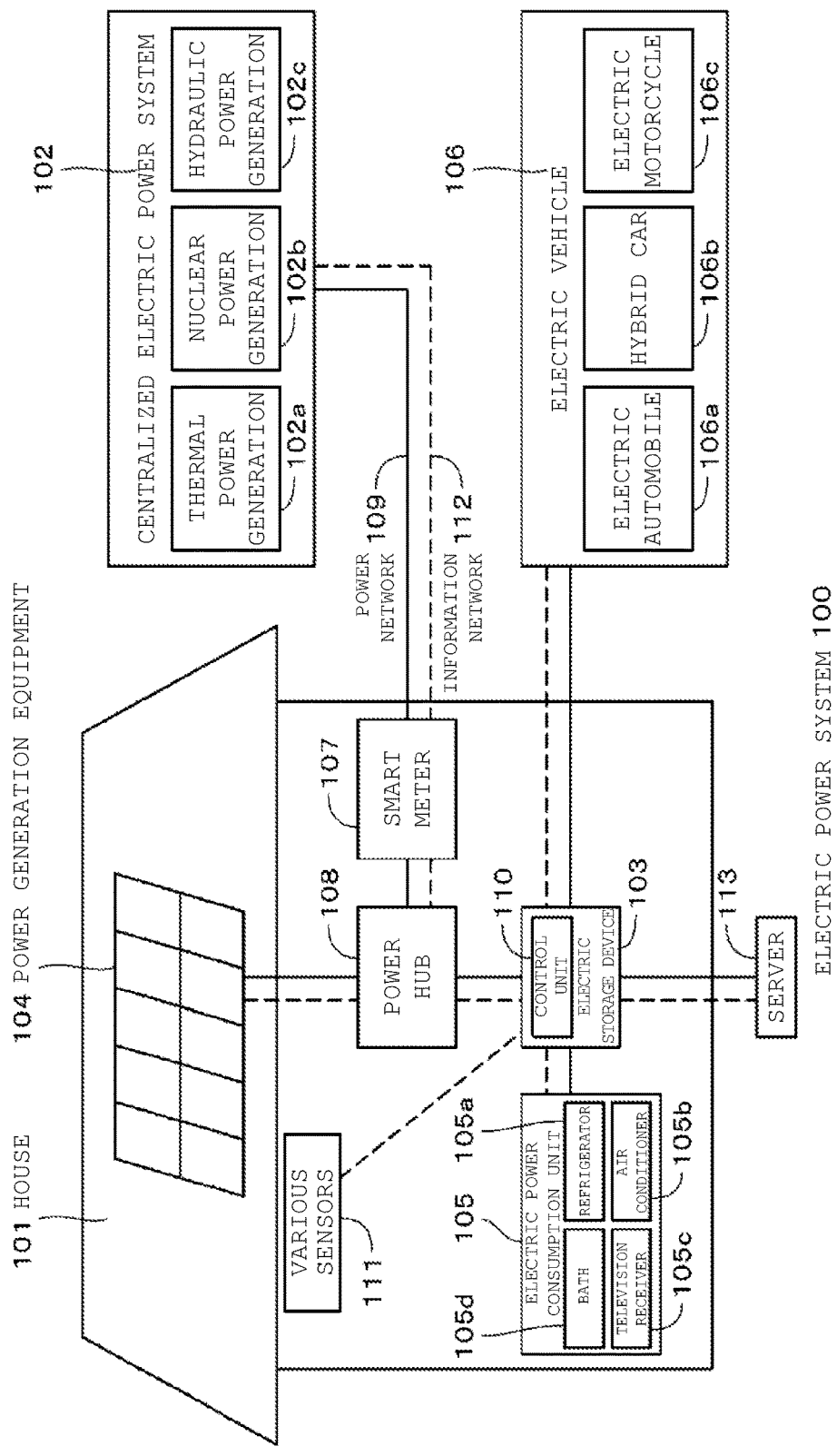
FIG. 12 is a block diagram for explaining an electric power system according to an embodiment.

Hereinafter, an example in which Example 4 is applied to an electric power system for residential use will be described with reference to FIG. 12.

For example, in an electric power system 100 for a house 101, electric power is supplied from a centralized electric power system 102 such as a thermal power generation 102a, a nuclear power generation 102b and a hydraulic power generation 102c to the electric storage device or the electric storage device assembly (hereinafter, referred to as "electric storage device and the like 103") via a power network 109, an information network 112, a smart meter 107, a power hub 108 and the like, and is stored. With this, electric power is supplied from an independent power source such as domestic power generation equipment 104 to the electric storage device and the like 103 and is stored. Electric power to be used in the house 101 is supplied from the electric storage device and the like 103. A similar electric power system can be used not only for the house 101 but also for a building.

In the house 101, there are provided the domestic power generation equipment 104, various electric and electronic apparatuses (electric power consumption equipment 105), the electric storage device and the like 103, a control unit 110 for controlling each equipment, the smart meter 107, and a sensor 111 for acquiring various kinds of information. The respective pieces of equipment are connected by the power network 109 and the information network 112. A solar cell, a fuel cell, or the like is used as the domestic power generation equipment 104, and the generated electric power is supplied to the electric power consumption equipment 105 and/or the electric storage device and the like 103. The electric power consumption equipment 105 is, for example, a refrigerator 105a, an air conditioner 105b, a television receiver 105c, a bath facility 105d, or the like. Further, the power consumption equipment includes electric moving means (specifically electric vehicle 106). The electric vehicle 106 is, for example, an electric automobile 106a, a hybrid car 106b, and an electric motorcycle 106c.

The electric storage device and the like 103 include the electric storage device of Example 1 or Example 2 or the electric storage device assembly of Example 3 according to an embodiment. The battery unit in the electric storage device and the like 103 is composed of a secondary battery (for example, a lithium ion battery) and a capacitor. The lithium ion battery may be stationary or may be one used in the electric vehicle 106. The smart meter 107 has a function of measuring the use amount of commercial power and sending the use amount measured to an electric power company. The power network 109 includes any one of DC (direct current) power supply, AC (alternate current) power supply and non-contact power supply, or a combining of a plurality of them.

The various sensors 111 are, for example, a monitor sensor, an illuminance sensor, an object detection sensor, a power consumption sensor, a vibration sensor, a contact sensor, a temperature sensor, an infrared sensor, and the like. Information acquired by the various sensors 111 is transmitted to the control unit 110. Based on the information from the sensors 111, the state of weather, the state of person, etc., are grasped and the electric power consumption equipment 105 is automatically controlled to allow minimization of the energy consumption. Further, the control unit 110 including a processor can transmit information relating to the house 101 to an external electric power company or the like via an Internet.

Branching of the power line and processing of DC-AC conversion and the like are carried out by the power hub 108. As a communication system of the information network 112 connected to the control unit 110, there are a method of using a communication interface such as UART (Universal Asynchronous Receiver-Transceiver: transmitting/receiving circuit for asynchronous serial communication) and a method of utilizing a sensor network based on a wireless communication standard such as Bluetooth, ZigBee (registered trademark), or Wi-Fi. Bluetooth system is applied to multimedia communication and allows communication of a one-to-many connection. ZigBee is a standard using a physical layer of IEEE 802.15.4. IEEE 802.15.4 is the name of a short-range wireless network standard called PAN (Personal Area Network) or W (Wireless) PAN.

The control unit 110 is connected to an external server 113. The server 113 may be managed by any of the house 101, an electric power company, and a service provider. The information transmitted and received by the server 113 is, for example, power consumption information, life pattern information, electric power bill, weather information, natural disaster information, and information relating to power trading. These pieces of information may be transmitted and received from a power consumption equipment (for example, a television receiver) in the home, or may be transmitted and received from equipment outside the home (for example, mobile phone). These pieces of information may be displayed on apparatus having a display function, such as a television receiver, a mobile phone, and a PDA (personal digital assistants).

The control unit 110 that controls each unit includes a CPU, a RAM, a ROM, and the like, and has a receiving device including an antenna or the like for receiving information via a network with another device, and is stored in the electric storage device and the like 103. Then, charge-discharge control of the electric storage device and the like 103 is performed based on information received by the receiving unit. The control unit 110 is connected to the domestic power generation equipment 104, the electric power consumption equipment 105, the various sensors 111, and the server 113 via the information network 112, and has, for example, a function of adjusting the use amount of commercial power and the amount of power generation. In addition, the control unit 110 may have a function to carry out power trading in a power market and the like.

As described above, not only power by the centralized electric power system 102 of the thermal power generation 102a, the nuclear power generation 102b, the hydraulic power generation 102c, etc. but also generated electric power of the domestic power generation equipment 104 (solar power generation, wind power generation) in the home can be stored in the electric storage device and the like 103. Therefore, even though the generated electric power of the domestic power generation equipment 104 varies, it is possible to perform such control that the amount of electric power sent to the outside is made constant or discharged as necessary. For example, electric power obtained by solar power generation is stored in the electric storage device and the like 103 and low-cost late-night power is stored in the electric storage device and the like 103 in the night. Furthermore, the electric power stored by the electric storage device 103 can be discharged and utilized in a high-cost time zone in the daytime.

In the above description, the example in which the control unit 110 is stored in the electric storage device and the like 103 has been described in this example, the control unit 110 may be stored in the smart meter 107 or may be configured singly. Further, the electric power system (electric storage system) 100 may be used for a plurality of homes in a collective housing, or may be used for a plurality of single-family houses.

Example 5 relates to an electric moving means such as an electric vehicle according to an embodiment of the present disclosure. The electric moving means of Example 5 includes:

the electric storage device of Example 1 or Example 2 (or the electric storage device assembly of Example 3);

a converting device that receives supply of electric power from the electric storage device of Example 1 or Example 2 (or the electric storage device assembly of Example 3) and converts the electric power into a driving force of a vehicle; and a control device that performs information processing for vehicle control based on information on the electric storage device of Example 1 or Example 2 (or the electric storage device assembly of Example 3).

Figure 13:
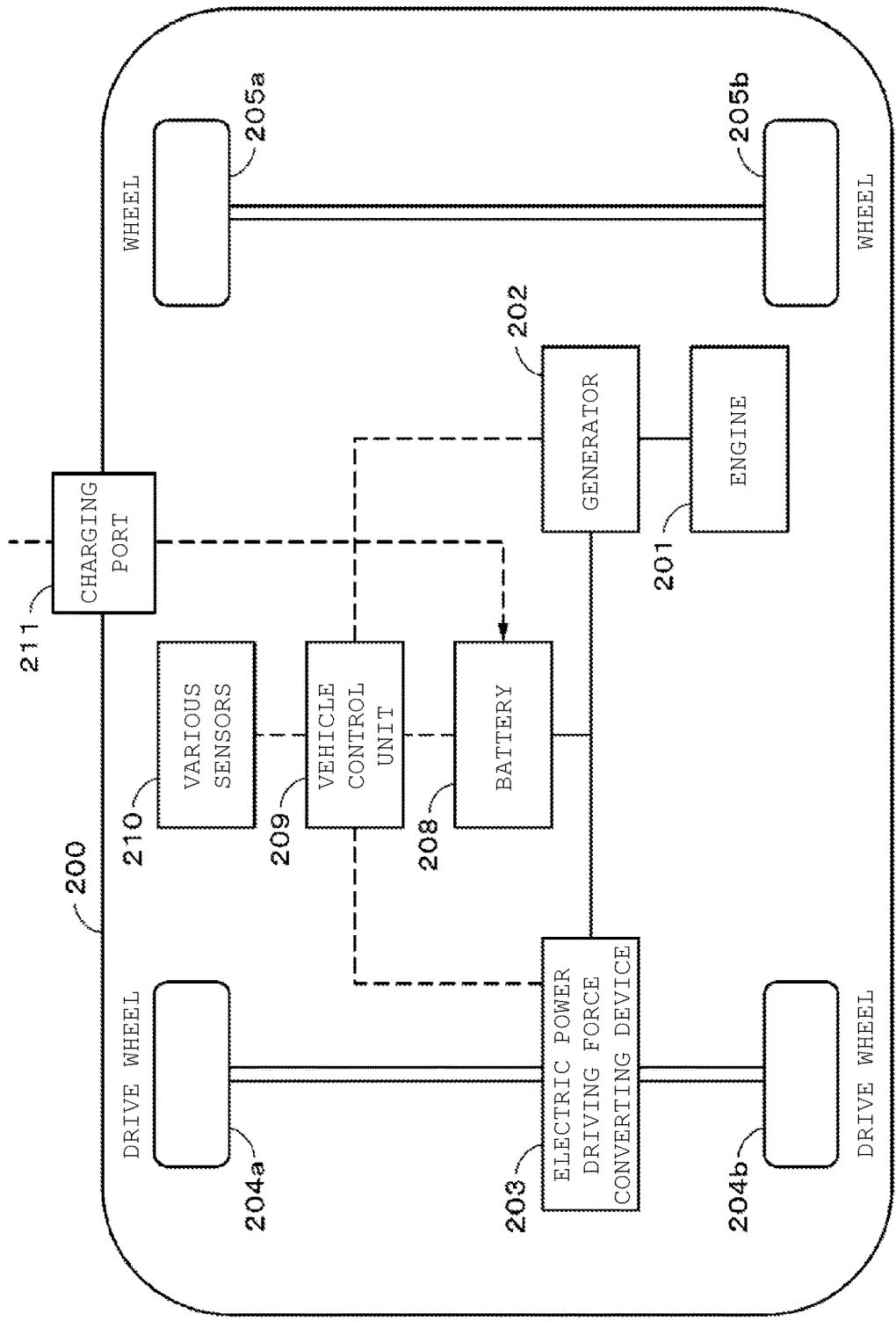
FIG. 13 is a block diagram for explaining an electric moving means according to an embodiment.

FIG. 13 schematically shows an example of a configuration of an electric moving means of Example 5, specifically, a hybrid vehicle employing a series hybrid system. The series hybrid system is a car that runs with an electric power driving force converting device by using electric power generated by a generator activated through an engine or electric power obtained by once storing electric power generated by a generator in an electric storage device (electric storage device assembly).

In the hybrid vehicle 200, an engine 201, a generator 202, an electric power driving force converting device 203, a drive wheel 204a, a drive wheel 204b, a wheel 205a, a wheel 205b, a battery (the electric storage device of Example 1 or Example 2, or the electric storage device assembly of Example 3) 208, a vehicle control unit 209, various sensors 210, and a charging port 211 are mounted. The vehicle control unit 209 also functions as the control unit as described herein, and performs, based on well-known methods, information processing for vehicle control based on information on the electric storage device of Example 1 or Example 2 (or the electric storage device assembly of Example 3). Specific example of the method of performing information processing includes an information processing device that displays the remaining battery level based on information on the remaining amount of the battery unit and the like.

The hybrid vehicle 200 runs by using the electric power driving force converting device 203 as a power source. One example of the electric power driving force converting device 203 may include a motor. The electric power driving force converting device 203 is operated by the electric power of the battery 208 and the rotational force of the electric power driving force converting device 203 is transmitted to the driving wheels 204a and 204b. By using direct current-alternating current (DC-AC) or reverse conversion (AC-DC conversion) for the necessary place, the electric power driving force converting device 203 can be applied to both an AC motor and a DC motor. The engine rotational speed and the opening degree (throttle opening degree) of a throttle valve (not shown) are controlled by the vehicle control unit 209 via various sensors 210. The various sensors 210 include a velocity sensor, an acceleration sensor, an engine rotational speed sensor, or the like. The rotational force of the engine 201 is transmitted to the generator 202, and the electric power generated by the generator 202 through the rotational force can be accumulated (stored) in the battery 208.

When the hybrid vehicle decelerates by a braking mechanism that is not shown in the diagram, resistance force at the time of deceleration is applied to the electric power driving force converting device 203 as a rotational force, and regenerative electric power generated by the electric power driving force converting device 203 is accumulated in the battery 208 by the rotational force.

It is also possible that the battery 208 is connected to a power supply outside the hybrid vehicle to thereby receive supply of electric power from the external power supply by using the charging port 211 as an input port and accumulate the received power.

An example of a series hybrid vehicle has been described which runs by the electric power driving force converting device (motor) 203 using the electric power generated by the generator driven through the engine or the electric power obtained by once storing the electric power in the battery 208. However, it is possible to employ a parallel hybrid car to be used by appropriately switching three modes of running a vehicle only with an engine, running a vehicle only with an electric power driving force converting device, and running a vehicle only with an engine and an electric power driving force converting device by way of both outputs of an engine and an electric power driving force converting device as a driving source. Furthermore, the present disclosure can be effectively applied to a so-called electric vehicle that runs by driving only through a driving motor without using an engine.

Although the present disclosure has been described based on examples described herein, the present disclosure is not limited to these examples. The configuration, structure, used materials, etc. of the electric storage device and electric storage device assembly described in the examples, and the electric and electronic apparatus, the electric moving means, the electric power system described in the examples are examples, and the method of assembling an electric storage device assembly described in the examples is also an example, and they may be modified as appropriate.

The present technology is described below in further detail according to an embodiment.

[A01] <<Electric storage device>>

An electric storage device including:

(a) a case that accommodates a battery unit provided with a first terminal portion and a second terminal portion, and that is provided with a first opening and a second opening on a first surface of the case;

(b) a first terminal for external connection disposed on the first surface of the case;

(c) a second terminal for external connection disposed on the first surface of the case and connected to a second terminal portion of the battery unit;

(d) a conduction state switching means that is, in the case, disposed between the first terminal portion of the battery unit and the first terminal for external connection and that is opposite to the first opening, and that brings a portion between the first terminal portion of the battery unit and the first terminal for external connection into a conducting state or a non-conducting state;

(e) an electronic component that is, in the case, disposed opposite to the second opening, and can be accessed from outside; and (f) a cover member having a connecting portion that is provided on an inner surface opposite to the first surface of the case and brings the conduction state switching means into a conducting state or a non-conducting state;

in which in a state where an inner surface of the cover member and the first surface of the case are opposite to each other and the connecting portion is fitted to the conduction state switching means, the cover member is attached to the first surface of the case and covers the first opening, and the second opening, the first terminal for external connection and the second terminal for external connection.

[A02] The electric storage device according to [A01], in which an engaging portion that engages with an edge portion of a cover member constituting another electric storage device is provided at an edge portion of the cover member.

[A03] The electric storage device according to [A01] or |A02|, in which the conduction state switching means includes:

an internal first terminal that is connected to the first terminal portion of the battery unit and disposed in the case opposite to the first opening; and an internal second terminal that is connected to the first terminal for external connection and disposed in the case opposite to the first opening, and the connecting portion is fitted to the internal first terminal and the internal second terminal.

[A04] The electric storage device according to [A03], in which the connecting portion is formed by bending a plate-like conductive material and has a first leg and a second leg, a first slit portion is provided on an opposing surface of the internal first terminal opposite to the first opening, a second slit portion is provided on an opposing surface of the internal second terminal opposite to the first opening, and the first leg of the connecting portion is inserted into the first slit portion, and the second leg of the connecting portion is inserted into the second slit portion when the connecting portion is fitted to the conduction state switching means.

[A05] The electric storage device according to [A03] or [A04], in which a fuse is inserted between the first terminal portion of the battery unit and the internal first terminal, between the first terminal for external connection and the internal second terminal, or between the first terminal portion of the battery unit and the internal first terminal and between the first terminal for external connection and the internal second terminal

[A06] The electric storage device according to any one of [A01] to [A05], in which the electronic component is a switch device for setting an address of the electric storage device.

[A07] The electric storage device according to any one of [A01] to [A06] further including a communication terminal for communication with an external control unit.

[A08] The electric storage device according to any one of [A01] to [A07], in which the electric storage device is charged by a power generation device that performs power generation based on renewable energy.

[A09] The electric storage device according to any one of [A01] to [A08], in which electric power is supplied to the Electric and Electronic Apparatus.

[B01] <<Electric storage device assembly>>

An electric storage device assembly including:

a plurality of electric storage devices; and a rack on which the plurality of electric storage devices are mounted, each of the plurality of electric storage devices including:

(a) a case that accommodates a battery unit provided with a first terminal portion and a second terminal portion, and that is provided with a first opening and a second opening on a first surface of the case;

(b) a first terminal for external connection disposed on the first surface of the case;

(c) a second terminal for external connection disposed on the first surface of the case and connected to a second terminal portion of the battery unit;

(d) a conduction state switching means that is, in the case, disposed between the first terminal portion of the battery unit and the first terminal for external connection and that is opposite to the first opening, and that brings a portion between the first terminal portion of the battery unit and the first terminal for external connection into a conducting state or a non-conducting state;

(e) an electronic component that is, in the case, disposed opposite to the second opening, and can be accessed from outside; and (f) a cover member having a connecting portion that is provided on an inner surface opposite to the first surface of the case and brings the conduction state switching means into a conducting state or a non-conducting state;

in which in a state where an inner surface of the cover member and the first surface of the case are opposite to each other and the connecting portion is fitted to the conduction state switching means, the cover member is attached to the first surface of the case and covers the first opening, and the second opening, the first terminal for external connection and the second terminal for external connection, a first engaging portion and a second engaging portion are provided at edge portions of the cover member, and the first engaging portion in the cover member of one electric storage device is engaged with the second engaging portion in the cover member of an electric storage device adjacent to the one electric storage device.

[B02] The electric storage device assembly according to [B01], in which the first engaging portion and the second engaging portion has a structure in which a first engaging portion in a cover member of an electric storage device on a low-voltage side is engaged with a second engaging portion in a cover member of an electric storage device on a high-voltage side.

[B03] The electric storage device assembly according to [B02], in which the first engaging portion protrudes from the cover member, and the first engaging portion in the cover member of the electric storage device on the low-voltage side covers the second engaging portion in the cover member of the electric storage device on the high-voltage side when the first engaging portion in the cover member of the electric storage device on the low-voltage side is engaged with the second engaging portion in the cover member of the electric storage device on the high-voltage side.

[B04] The electric storage device assembly according to [B02], in which the first engaging portion includes a first protruding portion and a first recessed portion (first groove), the second engaging portion includes a second recessed portion (second groove) and a second protruding portion, the first protruding portion of the first engaging portion in the cover member of the electric storage device on the low-voltage side covers the second recessed portion of the second engaging portion in the cover member of the electric storage device on the high-voltage side when the first protruding portion of the first engaging portion in the cover member of the electric storage device on the low-voltage side is engaged with the second recessed portion of the second engaging portion in the cover member of the electric storage device on the high-voltage side, and the second protruding portion of the second engaging portion in the cover member of the electric storage device on the high-voltage side fits in the first recessed portion of the first engaging portion in the cover member of the electric storage device on the low-voltage side when a second recessed portion of the first engaging portion in the cover member of the electric storage device on the low-voltage side is engaged with the second protruding portion of the second engaging portion in the cover member of the electric storage device on the high-voltage side.

[B05] The electric storage device assembly according to any one of [B01] to [B04], in which the conduction state switching means includes:

an internal first terminal that is connected to the first terminal portion of the battery unit and disposed in the case opposite to the first opening; and an internal second terminal that is connected to the first terminal for external connection and disposed in the case opposite to the first opening, and the connecting portion is fitted to the internal first terminal and the internal second terminal.

[B06] The electric storage device assembly according to [B05], in which the connecting portion is formed by bending a plate-like conductive material and has a first leg and a second leg, a first slit portion is provided on an opposing surface of the internal first terminal opposite to the first opening, a second slit portion is provided on an opposing surface of the internal second terminal opposite to the first opening, and the first leg of the connecting portion is inserted into the first slit portion, and the second leg of the connecting portion is inserted into the second slit portion when the connecting portion is fitted to the conduction state switching means.

[B07] The electric storage device assembly according to [B05] or [B06], in which a fuse is inserted between the first terminal portion of the battery unit and the internal first terminal, between the first terminal for external connection and the internal second terminal, or between the first terminal portion of the battery unit and the internal first terminal and between the first terminal for external connection and the internal second terminal.

[B08] The electric storage device assembly according to any one of [B01] to [B07], in which the electronic component is a switch device for setting an address of the electric storage device.

[B09] The electric storage device assembly according to any one of [B01] to [B08] further including a communication terminal for communication with an external control unit.

[B10] The electric storage device assembly according to any one of [B01] to [B09], in which the electric storage device is charged by a power generation device that performs power generation based on renewable energy.

[B11] The electric storage device assembly according to any one of [B01] to [B10], in which electric power is supplied to the electric and electronic apparatus.

[C01] <<Method of assembling electric storage device assembly>>

A method of assembling an electric storage device assembly including:
a plurality of electric storage devices; and
a rack on which the plurality of electric storage devices are mounted,
each of the plurality of electric storage devices including:
(a) a case that accommodates a battery unit provided with a first terminal portion and a second terminal portion, and that is provided with a first opening and a second opening on a first surface of the case;
(b) a first terminal for external connection disposed on the first surface of the case;
(c) a second terminal for external connection disposed on the first surface of the case and connected to a second terminal portion of the battery unit;
(d) a conduction state switching means that is, in the case, disposed between the first terminal portion of the battery unit and the first terminal for external connection and that is opposite to the first opening, and that brings a portion between the first terminal portion of the battery unit and the first terminal for external connection into a conducting state or a non-conducting state;
(e) an electronic component that is, in the case, disposed opposite to the second opening, and can be accessed from outside; and
(f) a cover member having a connecting portion that is provided on an inner surface opposite to the first surface of the case and brings the conduction state switching means into a conducting state or a non-conducting state,
the electric storage device assembly including a first engaging portion and a second engaging portion provided at edge portions of the cover member,
the method including:
a step of mounting an electric storage device on a low-voltage side on the rack next to an electric storage device on a high-voltage side mounted on the rack with the cover member removed;
a step of electrically connecting the second terminal for external connection of the electric storage device on the high-voltage side to the first terminal for external connection of the electric storage device on the low-voltage side; and
a step of attaching the cover member to the case so that the first engaging portion in the cover member of the electric storage device on the low-voltage side is engaged with the second engaging portion in the cover member of the electric storage device on the high-voltage side, and an inner surface of the cover member in the electric storage device on the low-voltage side and the first surface of the case are opposite to each other and the connecting portion is fitted to the conduction state switching means, to cover the first opening, the second opening, the first terminal for external connection and the second terminal for external connection with the cover member.

[D01] <<Electric and electronic apparatus>>
An electric and electronic device including the electric storage device according to any one of [A01] to [A07] and receiving supply of electric power from the electric storage device.

[D02] <<Electric and electronic apparatus>>
An electric and electronic device including the electric storage device assembly according to any one of [B01] to [B11] and receiving supply of electric power from the electric storage device assembly.

[D03]<<Electric moving means>>
An electric moving means including:
the electric storage device according to any one of [A01] to [A07];
a converting device that receives supply of electric power from the electric storage device and converts the electric power into a driving force of a vehicle; and
a control unit that performs information processing for vehicle control based on information on the electric storage device.

[D04] <<Electric moving means>>
An electric moving means including:
the electric storage device assembly according to any one of [B01] to [B11];
a converting device that receives supply of electric power from the electric storage device assembly and converts the electric power into a driving force of a vehicle; and
a control unit that performs information processing for vehicle control based on information on the electric storage device assembly.

[D05] <<Electric power system>>
An electric power system including:
the electric storage device according to any one of [A01] to [A07]; and
a receiving unit for receiving information via a network with another device,
the electric power system performing charge-discharge control of the electric storage device based on information received by the receiving unit.

[D06]<<Electric power system>>
An electric power system including:
the electric storage device assembly according to any one of [B01] to [B11]; and
a receiving unit for receiving information via a network with another device,
the electric power system performing charge-discharge control of the electric storage device assembly based on information received by the receiving unit.

[D07] <<Electric power system>>
An electric power system including the electric storage device according to any one of [A01] to [A07],
the electric power system receiving supply of electric power from the electric storage device or supplying electric power to the electric storage device from a power generation device or a power network.

[D08] <<Electric power system>>
An electric power system including the electric storage device assembly according to any one of [B01] to [B11],
the electric power system receiving supply of electric power from the electric storage device assembly or supplying electric power to the electric storage device from a power generation device or a power network.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. An electric storage device comprising:
a case including a first opening and a second opening provided on a first surface of the case, wherein the case is configured to house a battery unit, and the battery unit includes a first terminal portion and a second terminal portion;
a first terminal provided on the first surface of the case;

a second terminal provided on the first surface of the case and connected to the second terminal portion of the battery unit;

a conduction state switch provided between the first terminal portion of the battery unit and the first terminal of the case, wherein the conduction state switch is configured to connect with the first terminal portion of the battery unit and the first terminal;

an electronic component provided opposite to the second opening and configured to be accessed from outside; and a cover member including a connecting portion that is provided on an inner surface opposite to the first surface of the case, wherein the conduction state switch is in a conducting state when the connecting portion of the cover member is connected with the conduction state switch and the cover member is attached to the first surface of the case and covers the first opening, the second opening, the first terminal and the second terminal.

2. The electric storage device according to claim 1, wherein the cover member includes an engaging portion provided at an edge portion of the cover member, and wherein the engaging portion is configured to engage with an edge portion of another cover member.

3. The electric storage device according to claim 1, wherein
the conduction state switch includes:
an internal first terminal that is connected to the first terminal portion of the battery unit and provided in the case opposite to the first opening; and
an internal second terminal that is connected to the first terminal and provided in the case opposite to the first opening, and
the connecting portion is configured to be connected with the internal first terminal and the internal second terminal.

4. The electric storage device according to claim 3, wherein
the connecting portion includes a first leg and a second leg,
the conduction state switch includes a first slit portion and a second slit portion, and
the first leg of the connecting portion is inserted into the first slit portion, and the second leg of the connecting portion is inserted into the second slit portion when the connecting portion is connected with the conduction state switch.

5. The electric storage device according to claim 4, wherein the first slit portion is provided on an opposing surface of the internal first terminal opposite to the first opening, and wherein the second slit portion is provided on an opposing surface of the internal second terminal opposite to the first opening.

6. The electric storage device according to claim 3, wherein
a fuse is provided between the first terminal portion of the battery unit and the internal first terminal, between the first terminal and the internal second terminal, or between the first terminal portion of the battery unit and the internal first terminal and between the first terminal and the internal second terminal.

7. The electric storage device according to claim 1, wherein the electronic component is a switch device configured to set an address of the electric storage device.

8. The electric storage device according to claim 1 further comprising a communication terminal configured to communicate with an external control unit.

9. The electric storage device according to claim 1, wherein the electric storage device is configured to be charged by a power generation device configured to perform power generation based on renewable energy.

10. The electric storage device according to claim 1, wherein electric power is configured to be supplied to the electric storage device.

11. An apparatus comprising the electric storage device according to claim 1, wherein the apparatus is configured to receive power supply from the electric storage device.

12. An electric vehicle comprising:
the electric storage device according to claim 1;
a converting device configured to receive supply of electric power from the electric storage device and convert the electric power into a driving force of the electric vehicle; and
a control circuit configured to perform information processing for vehicle control based on information on the electric storage device.

13. An electric power system comprising:
the electric storage device according to claim 1; and
a receiving device configured to receive information via a network with another device, wherein the electric power system is configured to perform charge-discharge control of the electric storage device based on information received by the receiving device.

14. An electric power system comprising the electric storage device according to claim 1, wherein the electric power system is configured to receive supply of electric power from the electric storage device or supply electric power to the electric storage device from a power generation device or a power network.

15. An electric storage device assembly comprising:
a plurality of electric storage devices; and
a rack on which the plurality of electric storage devices are mounted,
each of the plurality of electric storage devices including:
a case including a first opening and a second opening provided on a first surface of the case, wherein the case is configured to house a battery unit, and the battery unit includes a first terminal portion and a second terminal portion;
a first terminal provided on the first surface of the case;
a second terminal provided on the first surface of the case and connected to the second terminal portion of the battery unit;
a conduction state switch provided between the first terminal portion of the battery unit and the first terminal of the case, wherein the conduction state switch is configured to connect with the first terminal portion of the battery unit and the first terminal;
an electronic component provided opposite to the second opening and configured to be accessed from outside; and
a cover member including a connecting portion that is provided on an inner surface opposite to the first surface of the case,
wherein the conduction state switch is in a conducting state when the connecting portion of the cover member is connected with the conduction state switch and the cover member is attached to the first surface of the case and covers the first opening, the second opening, the first terminal and the second terminal, wherein each the cover member includes a first and second engaging portions provided at edge portions of the cover member, and wherein the first engaging portion in the cover member of a first electric storage device is engaged with the second engaging portion in the cover member of a second electric storage device adjacent to the first electric storage device.

16. The electric storage device assembly according to claim 15, wherein the first engaging portion in the cover member of the first electric storage device on a low-voltage side is engaged with the second engaging portion in the cover member of the second electric storage device on a high-voltage side.

17. The electric storage device assembly according to claim 16, wherein the first engaging portion protrudes from the cover member of the first electric storage device, and the first engaging portion in the cover member of the first electric storage device on the low-voltage side covers the second engaging portion in the cover member of the second electric storage device on the high-voltage side when the first engaging portion in the cover member of the first electric storage device on the low-voltage side is engaged with the second engaging portion in the cover member of the second electric storage device on the high-voltage side.

18. The electric storage device assembly according to claim 16, wherein the first engaging portion includes a first protruding portion and a first recessed portion, the second engaging portion includes a second recessed portion and a second protruding portion, the first protruding portion of the first engaging portion in the cover member of the first electric storage device on the low-voltage side covers the second recessed portion of the second engaging portion in the cover member of the second electric storage device on the high-voltage side when the first protruding portion of the first engaging portion in the cover member of the first electric storage device on the low-voltage side is engaged with the second recessed portion of the second engaging portion in the cover member of the second electric storage device on the high-voltage side, and the second protruding portion of the second engaging portion in the cover member of the second electric storage device on the high-voltage side fits in the first recessed portion of the first engaging portion in the cover member of the first electric storage device on the low-voltage side when a second recessed portion of the first engaging portion in the cover member of the first electric storage device on the low-voltage side is engaged with the second protruding portion of the second engaging portion in the cover member of the second electric storage device on the high-voltage side.

19. A method of assembling an electric storage device assembly including a plurality of electric storage devices including a first electric storage device and a second electric storage device, the electric storage devices including:

a case including a first opening and a second opening provided on a first surface of the case, wherein the case is configured to house a battery unit, and the battery unit includes a first terminal portion and a second terminal portion;

a first terminal provided on the first surface of the case;

a second terminal provided on the first surface of the case and connected to the second terminal portion of the battery unit;

a conduction state switch provided between the first terminal portion of the battery unit and the first terminal of the case, wherein the conduction state switch is configured to connect with the first terminal portion of the battery unit and the first terminal;

an electronic component provided opposite to the second opening and configured to be accessed from outside; and a cover member including a connecting portion that is provided on an inner surface opposite to the first surface of the case, wherein the connection portion is configured to connect with the conduction state switch, wherein the electric storage devices include a first and second engaging portions provided at edge portions of the cover member, the method comprising:

mounting the first electric storage device on a low-voltage side on a rack next to the second electric storage device on a high-voltage side mounted on the rack with the cover member removed;

electrically connecting the second terminal for external connection of the second electric storage device on the high-voltage side to the first terminal for external connection of the first electric storage device on the low-voltage side; and attaching the cover member to the case so that the first engaging portion in the cover member of the first electric storage device on the low-voltage side is engaged with the second engaging portion in the cover member of the second electric storage device on the high-voltage side, and an inner surface of the cover member in the first electric storage device on the low-voltage side and the first surface of the case are opposite to each other and the connecting portion is connected to the conduction state switch, to cover the first opening, the second opening, the first terminal for external connection and the second terminal for external connection with the cover member.

* * * * *